(12) United States Patent
Scott et al.

(10) Patent No.: US 8,101,251 B2
(45) Date of Patent: Jan. 24, 2012

(54) CHEMICALLY CURING ALL-IN-ONE WARM EDGE SPACER AND SEAL

(75) Inventors: Edward Burton Scott, Rockford, MI (US); Andreas Thomas Wolf, Huenstetten (DE)

(73) Assignee: Dow Corning Corporation, Midland, MI (US)

( * ) Notice: Subject to any disclaimer, the term of this patent is extended or adjusted under 35 U.S.C. 154(b) by 453 days.

(21) Appl. No.: 12/305,007

(22) PCT Filed: Jun. 25, 2007

(86) PCT No.: PCT/US2007/014669
§ 371 (c)(1),
(2), (4) Date: Dec. 16, 2008

(87) PCT Pub. No.: WO2008/005214
PCT Pub. Date: Jan. 10, 2008

(65) Prior Publication Data
US 2009/0291238 A1    Nov. 26, 2009

Related U.S. Application Data

(60) Provisional application No. 60/818,046, filed on Jul. 3, 2006.

(51) Int. Cl.
| | |
|---|---|
| *E06B 3/00* | (2006.01) |
| *E04C 2/54* | (2006.01) |
| *C08K 3/26* | (2006.01) |
| *C08F 30/08* | (2006.01) |
| *C08F 130/08* | (2006.01) |

(52) U.S. Cl. ......... 428/34; 52/786.1; 524/425; 526/279; 525/342

(58) Field of Classification Search .................. 428/34; 52/786.13; 524/425; 526/279; 525/288, 525/342

See application file for complete search history.

(56) References Cited

U.S. PATENT DOCUMENTS

| | | |
|---|---|---|
| 3,758,996 A | 9/1973 | Bowser |
| 3,876,489 A | 4/1975 | Chenel |
| 4,085,238 A | 4/1978 | Chenel et al. |
| 4,120,999 A | 10/1978 | Chenel et al. |
| 4,186,685 A | 2/1980 | Chenel et al. |

(Continued)

FOREIGN PATENT DOCUMENTS

DE    4227217    2/1993

(Continued)

OTHER PUBLICATIONS

Zweifel, Hans, "Effect of Stabilization of Polypropylene during Processing and Its Influence on Long-Term Behavior under Thermal Stress", 1996, pp. 378-396, Amer. Chem. Soc.

(Continued)

*Primary Examiner* — Donald J Loney
(74) *Attorney, Agent, or Firm* — Howard & Howard Attorneys PLLC

(57) ABSTRACT

A water release agent that release water over an application temperature range in an amount sufficient to cure a composition is add to a curable composition containing 10 to 65 weight % of a moisture-curable, silane-functional, elastomeric, organic polymer; 0.1 to 3 weight % of a condensation catalyst; and (C) 15 to 25 weight % of a physical drying agent. When used as an edge-seal in an IG unit, the cured product of the composition performs the functions of sealing, bonding, spacing, and desiccating.

29 Claims, 1 Drawing Sheet

U.S. PATENT DOCUMENTS

| | | | |
|---|---|---|---|
| 4,198,254 A | 4/1980 | Laroche et al. |
| 4,205,104 A | 5/1980 | Chenel |
| 4,215,164 A | 7/1980 | Bowser |
| 4,602,078 A | 7/1986 | Joseph et al. |
| 4,622,249 A | 11/1986 | Bowser |
| 4,714,425 A | 12/1987 | Lenhardt |
| 4,808,664 A | 2/1989 | Saam |
| 4,824,355 A | 4/1989 | Lenhardt |
| 4,837,401 A | 6/1989 | Hirose et al. |
| 4,877,840 A | 10/1989 | Chu |
| 4,900,772 A | 2/1990 | Imanaka et al. |
| 4,904,732 A | 2/1990 | Iwahara et al. |
| 4,962,076 A | 10/1990 | Chu et al. |
| 5,033,249 A | 7/1991 | Scheeren et al. |
| 5,051,455 A | 9/1991 | Chu et al. |
| 5,053,442 A | 10/1991 | Chu et al. |
| 5,075,387 A | 12/1991 | Hous et al. |
| 5,120,379 A | 6/1992 | Noda et al. |
| 5,162,445 A | 11/1992 | Powers et al. |
| 5,191,005 A | 3/1993 | Murata et al. |
| 5,250,607 A | 10/1993 | Comert et al. |
| 5,262,502 A | 11/1993 | Fujisawa et al. |
| 5,270,091 A | 12/1993 | Krysiak et al. |
| 5,290,873 A | 3/1994 | Noda et al. |
| 5,376,503 A | 12/1994 | Audett et al. |
| 5,405,889 A | 4/1995 | Hatanaka et al. |
| 5,459,174 A | 10/1995 | Merrill et al. |
| 5,545,718 A | 8/1996 | Plaue et al. |
| 5,580,925 A | 12/1996 | Iwahara et al. |
| 5,632,122 A | 5/1997 | Spinks |
| 5,849,832 A | 12/1998 | Virnelson et al. |
| 5,855,972 A | 1/1999 | Kaeding |
| 5,936,110 A | 8/1999 | Yoshitake et al. |
| 5,961,759 A | 10/1999 | Schubert |
| 5,994,474 A | 11/1999 | Wey et al. |
| 6,025,445 A | 2/2000 | Chiba et al. |
| 6,121,379 A | 9/2000 | Yamanaka et al. |
| 6,130,306 A | 10/2000 | Kalinowski et al. |
| 6,136,910 A | 10/2000 | Virnelson et al. |
| 6,150,441 A | 11/2000 | Chiba et al. |
| 6,177,519 B1 | 1/2001 | Chung et al. |
| 6,218,475 B1 | 4/2001 | Hiro et al. |
| 6,238,755 B1 | 5/2001 | Harvey et al. |
| 6,286,288 B1 | 9/2001 | France |
| 6,335,412 B1 | 1/2002 | Okamoto et al. |
| 6,380,316 B1 | 4/2002 | Bahadur et al. |
| 6,426,392 B1 | 7/2002 | Chiba et al. |
| 6,457,294 B1 | 10/2002 | Vimelson et al. |
| 6,491,966 B1 | 12/2002 | Lisec |
| 6,492,281 B1 | 12/2002 | Song et al. |
| 6,706,813 B2 | 3/2004 | Chiba et al. |
| 6,787,597 B1 | 9/2004 | Martin et al. |
| 6,998,459 B2 | 2/2006 | Roesler et al. |
| 7,005,476 B1 | 2/2006 | Terfloth et al. |
| 7,214,750 B2 | 5/2007 | McDonald et al. |
| 7,232,872 B2 | 6/2007 | Shaffer et al. |
| 7,259,209 B2 | 8/2007 | Grimm et al. |
| 7,270,859 B2 | 9/2007 | Acevedo et al. |
| 7,332,554 B2 | 2/2008 | Shaffer et al. |
| 7,457,294 B2 | 11/2008 | Lin et al. |
| 2003/0187145 A1 | 10/2003 | Martin et al. |
| 2004/0059069 A1 | 3/2004 | Grimm et al. |
| 2004/0068036 A1 | 4/2004 | Halladay et al. |
| 2004/0116602 A1 | 6/2004 | Botros |
| 2004/0171759 A1 | 9/2004 | Lange et al. |
| 2004/0176558 A1 | 9/2004 | Coca et al. |
| 2004/0180154 A1 | 9/2004 | Wang et al. |
| 2004/0181007 A1* | 9/2004 | Acevedo et al. ............ 524/589 |
| 2004/0258859 A1 | 12/2004 | Acevedo et al. |
| 2005/0113498 A1 | 5/2005 | Auerbach |
| 2007/0003717 A1 | 1/2007 | Kawasaki et al. |

FOREIGN PATENT DOCUMENTS

| | | |
|---|---|---|
| DE | 4407892 | 9/1995 |
| DE | 19821356 | 9/2005 |
| EP | 0445199 | 6/1992 |
| EP | 0805254 | 3/1997 |
| EP | 0577276 | 8/1997 |
| EP | 0823318 | 8/1997 |
| EP | 0857847 B1 | 2/1998 |
| EP | 0831202 A2 | 3/1998 |
| EP | 0714964 | 7/1998 |
| EP | 0906378 B1 | 10/2002 |
| EP | 1099728 B1 | 2/2003 |
| EP | 1422376 A1 | 5/2004 |
| EP | 1462500 A1 | 9/2004 |
| EP | 1018590 B1 | 10/2004 |
| EP | 1563006 B1 | 3/2006 |
| EP | 1466939 B1 | 12/2008 |
| FR | 2570366 | 9/1984 |
| JP | 08-127724 | 5/1996 |
| JP | 11-217243 | 8/1999 |
| JP | 03-505590 | 12/2003 |
| JP | 2004-315763 | 11/2004 |
| SU | 804669 | 7/1978 |
| WO | WO 90/02696 | 3/1990 |
| WO | WO 91/06580 | 5/1991 |
| WO | WO 94/09067 | 4/1994 |
| WO | WO 95/11363 | 4/1995 |
| WO | WO 95/11364 | 4/1995 |
| WO | WO 00/73613 | 12/2000 |
| WO | WO 2004/019421 | 3/2004 |
| WO | WO 2004/035635 | 4/2004 |
| WO | WO 2004/046240 | 6/2004 |
| WO | WO 2004/081329 | 9/2004 |

OTHER PUBLICATIONS

JP 01-163255, Jun. 27, 1989, Kanegafuchi Chem Ind Co Ltd. Abstract.
JP 01-163281, Jun. 27, 1989, Yokohama Rubber Co Ltd. Abstract.
JP 04-159371, Jun. 2, 1992, Kanegafuchi Chem Ind Co Ltd. Abstract.
JP 05-179217, Jul. 20, 1993, Sumitomo Electric Ind Ltd. Abstract.
JP 08-041358, Feb. 13, 2996, Kanegafuchi Chem Ind Co Ltd. Abstract.
JP 11-209540, Aug. 3, 1999, Kanegafuchi Chem Ind Co Ltd. Abstract.
JP 11-323153, Nov. 26, 1999, Kanegafuchi Chem Ind Co Ltd. Abstract.
JP 2001-288441, Oct. 16, 2001, Hitachi Kasei Polymer Co Ltd. Abstract.
JP 2001-303024, 20-31-2001, Three Bond Co Ltd. Abstract.
JP 2003-026875, Jan. 29, 2003. Abstract.
JP 01-165649, Jun. 29, 1989. Abstract.
Wey, H.G. Dr., "Vestoplast-Amorphous Polyalphaolefins Properties and Applications in the Formulation of Hot Melt Adhesives", European Industrial Adhesives Conference, Apr. 26-28, 1995, pp. 32.1-32.19, Brussels.

* cited by examiner

CHEMICALLY CURING ALL-IN-ONE WARM EDGE SPACER AND SEAL

CROSS REFERENCE TO RELATED APPLICATIONS

This application is a U.S. national stage filing under 35 U.S.C. §371 of PCT Application No. PCT/US07/014,669 filed on 25 Jun. 2007, currently pending, which claims the benefit of U.S. Provisional Patent Application No. 60/818,046 filed 3 Jul. 2006 under 35 U.S.C. §119 (e). PCT Application No. PCT/US07/014,669 and U.S. Provisional Patent Application No. 60/818,046 are hereby incorporated by reference.

STATEMENT REGARDING FEDERALLY FUNDED RESEARCH AND DEVELOPMENT

None.

BACKGROUND OF THE INVENTION

1. Technical Field

An "all-in-one" spacer and seal useful in insulating glass units is based on silane-functional, elastomeric, organic polymer (e.g., silicon-curable polyisobutylene or silicon-curable butyl rubber) technology. This chemically crosslinking (curing) flexible thermoset spacer and seal offers a solution to overcome the current shortfalls of commercially available thermoplastic spacer materials. The thermoset material cures, develops adhesion, and offers the strength to support the glass panels of an insulating glass unit. The spacer and seal offers four functions of the edge-seal, namely sealing, bonding, spacing, and desiccating, thus an "all-in-one" solution.

2. Background

Insulating glass (IG) units are known in the art. In a typical IG unit, panes of glass are held parallel to one another a fixed distance apart by a spacer. A primary sealant is used as a barrier between the panes. The primary sealant may be used to prevent water vapor from migrating into the space between the panes (interpane space). The primary sealant may also be used to prevent inert gas, such as argon, from migrating out of the interpane space. A secondary sealant is used to adhere the panes to each other and the spacer. Desiccants may be added to the spacer to remove moisture from the interpane space. The spacer may be formed from metal (e.g., aluminum, stainless steel), plastic, plastic coated metal, foam (e.g., EPDM, silicone), or other suitable materials.

PROBLEMS TO BE SOLVED

A more efficient method for producing IG units is desired. A single sealant composition that performs more than one of the functions of the primary sealant, secondary sealant, spacer, and desiccant namely sealing, bonding, spacing, and desiccation, is desired. Preferably, a single sealant composition that performs all of these functions, thus an "all-in-one" solution, is desired.

BRIEF SUMMARY OF THE INVENTION

An "all-in-one" sealant composition useful in IG applications is disclosed. The composition comprises: (A) a moisture-curable, silane-functional, elastomeric, organic polymer; (B) a condensation catalyst; (C) a drying agent; and (D) a water release agent that releases water over an application temperature range.

The inventors surprisingly found that a moisture-curable, silane-functional, elastomeric, organic polymer can be cured in the presence of both the drying agent and the water release agent.

DETAILED DESCRIPTION OF THE INVENTION

Figure 1:
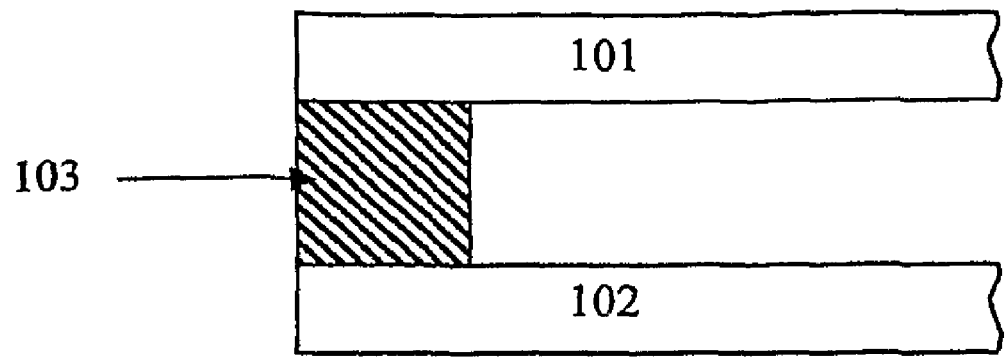
FIG. 1 is a partial cross section of an IG unit.

The invention relates to an "all-in-one" sealant composition useful in IG applications. The composition may be a one-part or multiple-part composition. The composition comprises: (A) 10 weight parts to 65 weight parts of a moisture-curable, silane-functional, elastomeric, organic polymer; (B) 0.1 weight parts to 3 weight parts of a condensation catalyst; (C) 15 weight parts to 25 weight parts of a physical drying agent; (D) 5 weight parts to 30 weight parts a water release agent that releases water over an application temperature range; (E) 0 weight parts to 30 weight parts of a filler other than ingredients (C) and (D); (F) 0 weight parts to 30 weight parts of a non-reactive, elastomeric, organic polymer; (G) 0 weight parts to 5 weight parts of a crosslinker; (H) 0 weight parts to 5 weight parts of a chemical drying agent other than ingredient (G); (I) 0 weight parts to 5 weight parts of an adhesion promoter other than ingredients (G) and (H); (J) 0 weight parts to 20 weight parts of a microcrystalline wax, which is a solid at 25° C. and has a melting point selected such that the wax melts at the low end of the desired application temperature range; (K) 0 weight parts to 3 weight parts of an anti-aging additive; and (L) 0 weight parts to 20 weight parts of a tackifying agent.

Ingredient (A) Moisture-Curable, Silane-Functional, Elastomeric, Organic Polymer Ingredient (A) is a moisture-curable, silane-functional, elastomeric, organic polymer. For purposes of this application, 'elastomeric' refers to the rubbery consistency imparted to the composition by ingredient (A), and ingredient (A) is distinguished from semi-crystalline and amorphous polyolefins (e.g., alpha-olefins), commonly referred to as thermoplastic polymers.

Ingredient (A) may comprise a silylated copolymer of an iso-mono-olefin and a vinyl aromatic monomer, a silylated copolymer of a diene and a vinyl aromatic monomer, a silylated copolymer of an olefin and a diene (e.g., an optionally halogenated silylated butyl rubber prepared from polyisobutylene and isoprene), or a combination thereof (silylated copolymers), a silylated homopolymer of the iso-mono-olefin, a silylated homopolymer of the vinyl aromatic monomer, a silylated homopolymer of the diene (e.g., silylated polybutadiene or silylated hydrogenated polybutadiene), or a combination thereof (silylated homopolymers) or a combination silylated copolymers and silylated homopolymers. For purposes of this application, silylated copolymers and silylated homopolymers are referred to collectively as 'silylated polymers'. The silylated polymer may optionally contain one or more halogen groups, particularly bromine groups.

Ingredient (A) may be a silylated polymer comprising a silane-functional group of formula:

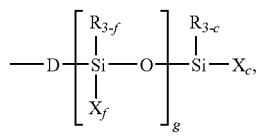

where D represents a divalent organic group, each X independently represents a hydrolyzable group, each R independently represents a monovalent hydrocarbon group, subscript e represents 0, 1, 2, or 3, subscript f represents 0, 1, or 2, and subscript g has a value ranging from 0 to 18, with the proviso that the sum of e+f is at least 1.

Alternatively, D may be a divalent hydrocarbon group such as ethylene, propylene, butylene, and hexylene. Alternatively, each X may be selected from the group consisting of an alkoxy group; an alkenyloxy group; an amido group, such as an acetamido, a methylacetamido group, or benzamido group; an acyloxy group such as acetoxy; an amino group; an aminoxy group; a hydroxyl group; a mercapto group; an oximo group, and a ketoximo group. Alternatively, each R may be independently selected from alkyl groups of 1 to 20 carbon atoms, aryl groups of 6 to 20 carbon atoms, and aralkyl groups of 7 to 20 carbon atoms. Alternatively, subscript g is 0.

Examples of suitable mono-iso-olefins include but are not limited to isoalkylenes such as isobutylene, isopentylene, isohexylene, and isoheptylene; alternatively isobutylene. Examples of suitable vinyl aromatic monomers include but are not limited to alkylstyrenes such as alpha-methylstyrene, t-butylstyrene, and para-methylstyrene; alternatively para-methylstyrene. Examples of suitable alkyl groups include methyl, ethyl, n-propyl, isopropyl, n-butyl, isobutyl, and t-butyl; alternatively methyl. Examples of suitable alkenyl groups include, vinyl, allyl, propenyl, butenyl, and hexenyl; alternatively vinyl. Ingredient (A) may have average molecular weight (Mn) ranging from 20,000 to 100,000, alternatively 25,000 to 50,000, and alternatively 28,000 to 35,000. Ingredient (A) may contain an amount of silane-functional groups ranging from 0.2% to 10%, alternatively 0.5% to 5%, and alternatively 0.5% to 2.0%.

Suitable examples of silylated copolymers and methods for their preparation are known in the art and are exemplified by the silylated copolymers disclosed in EP 0 320 259 B1 (Dow Corning); DE 19,821,356 A1 (Metallgesellschaft); and U.S. Pat. Nos. 4,900,772 (Kaneka); 4,904,732 (Kaneka); 5,120, 379 (Kaneka); 5,262,502 (Kaneka); 5,290,873 (Kaneka); 5,580,925 (Kaneka), 4,808,664 (Dow Corning), 6,380,316 (Dow Corning/ExxonMobil); and 6,177,519 (Dow Corning/ExxonMobil). U.S. Pat. Nos. 6,380,316 and 6,177,519 are hereby incorporated by reference. Briefly stated, the method for preparing the silylated copolymers of U.S. Pat. No. 6,177, 519 involves contacting i) an olefin copolymer having at least 50 mole % of an iso-mono-olefin having 4 to 7 carbon atoms and a vinyl aromatic monomer; ii) a silane having at least two hydrolyzable organic groups and at least one olefinically unsaturated hydrocarbon or hydrocarbonoxy group; and iii) a free radical generating agent.

Alternatively, silylated copolymers may be prepared by a method comprising conversion of commercially available hydroxylated polybutadiene (such as those commercially available from Sartomer under tradename Poly BD) by known methods (e.g., reaction with isocyanate functional alkoxysilane, reaction with allylchloride in presence of Na followed by hydrosilylation).

The amount of ingredient (A) may range from 10 parts to 65 parts, alternatively 10 parts to 35 parts, and alternatively 15 parts to 35 parts, based on the weight of the composition. Ingredient (A) may be one moisture-curable, silane-functional, elastomeric, organic polymer. Alternatively, ingredient (A) may comprise two or more moisture-curable, silane-functional, elastomeric, organic polymers that differ in at least one of the following properties: structure, viscosity, average molecular weight, polymer units, and sequence.

Ingredient (B) Condensation Catalyst

Ingredient (B) is a condensation catalyst. Suitable condensation catalysts include tin (IV) compounds, tin (II) compounds, and titanates. Examples of tin (IV) compounds include dibutyl tin dilaurate (DBTDL), dimethyl tin dilaurate, di-(n-butyl)tin bis-ketonate, dibutyl tin diacetate, dibutyl tin maleate, dibutyl tin diacetylacetonate, dibutyl tin dimethoxide carbomethoxyphenyl tin tris-uberate, isobutyl tin triceroate, dimethyl tin dibutyrate, dimethyl tin di-neodeconoate, triethyl tin tartrate, dibutyl tin dibenzoate, butyltin-tri-2-ethylhexoate, a dioctyl tin diacetate, tin octylate, tin oleate, tin butyrate, tin naphthenate, dimethyl tin dichloride, and a combination thereof. Tin (IV) compounds are known in the art and are commercially available, such as Metatin 740 and Fascat 4202.

Examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, and a combination thereof.

Examples of organofunctional titanates include 1,3-propanedioxytitanium bis(ethylacetoacetate); 1,3-propanedioxytitanium bis(acetylacetonate); diisopropoxytitanium bis(acetylacetonate); 2,3-di-isopropoxy-bis(ethylacetate) titanium; titanium naphthenate; tetrapropyltitanate; tetrabutyltitanate; tetraethylhexyltitanate; tetraphenyltitanate; tetraoctadecyltitanate; tetrabutoxytitanium; tetraisopropoxytitanium; ethyltriethanolaminetitanate; a betadicarbonyltitanium compound such as bis(acetylacetonyl) diisopropyltitanate; or a combination thereof. Siloxytitanates are exemplified by tetrakis(trimethylsiloxy)titanium, bis(trimethylsiloxy)bis(isopropoxy)titanium, or a combination thereof.

The amount of ingredient (B) is sufficient to cure the composition. The amount of ingredient (B) may range from 0.1 parts to 3 parts, alternatively 0.2 parts to 2 parts, based on the weight of the composition. Ingredient (B) may be one condensation catalyst. Alternatively, ingredient (B) may comprise two or more different condensation catalysts.

Ingredient (C) Drying Agent

Ingredient (C) is a drying agent. The drying agent binds water from various sources. In IG applications, the drying agent may bind water that an IG unit contains between panes upon its manufacture and/or that diffuses into the interpane space during service life of the IG unit. The drying agent may bind by-products of the curing reaction such as water and alcohols. The drying agent binds the water and by-products by physical means. For example, the drying agent may bind the water and by-products by physically adsorbing or absorbing them. Ingredient (C) may be added to the composition to perform the desiccating function of an edge-seal in an IG unit and to reduce or eliminate chemical fogging of the IG unit that may be caused by-products of the curing reaction.

Examples of suitable adsorbents for ingredient (C) may be inorganic particulates. The adsorbent may have a particle size of 10 micrometers or less, alternatively 5 micrometers or less. The adsorbent may have average pore size sufficient to adsorb water and alcohols, for example 10 Å (Angstroms) or less, alternatively 5 Å or less, and alternatively 3 Å or less. Examples of adsorbents include zeolites such as chabasite, mordenite, and analcite; molecular sieves such as alkali metal alumino silicates, silica gel, silica-magnesia gel, activated carbon, activated alumina, calcium oxide, and combinations thereof. One skilled in the art would be able to select suitable drying agents for ingredient (C) without undue experimentation. One skilled in the art would recognize that certain drying agents such as silica gel will bind water, while others such as molecular sieves may bind water, alcohols, or both.

Examples of commercially available drying agents include dry molecular sieves, such as 3 Å (Angstrom) molecular sieves, which are commercially available from Grace Davidson under the trademark SYLOSIV® and from Zeochem of Louisville, Ky., U.S.A. under the trade name PURMOL, and 4 Å molecular sieves such as Doucil zeolite 4A available from Ineos Silicas of Warrington, England. Other useful molecular sieves include MOLSIV ADSORBENT TYPE 13X, 3A, 4A, and 5A, all of which are commercially available from UOP of Illinois, U.S.A.; SILIPORITE NK 30AP and 65xP from Atofina of Philadelphia, Pa., U.S.A.; and molecular sieves available from W. R. Grace of Maryland, U.S.A.

Ingredient (D) Water Release Agent

Ingredient (D) is a water release agent that releases water over an application temperature range. Ingredient (D) is selected such that ingredient (D) contains an amount of water sufficient to cure the composition and such that ingredient (D) releases the sufficient amount of water to cure the composition when exposed for a sufficient amount of time to a temperature in the application temperature range, for example, by the method of reference example 2 herein. However, ingredient (D) binds the water sufficiently to prevent too much from being released during processing. For example, ingredient (D) binds the water sufficiently during compounding of the composition such that sufficient water is available for curing the composition during or after the application process in which the composition is used. This "controlled release" property also may provide the benefit of ensuring that not too much water is released too rapidly during the application process, since this may cause bubbling or voiding in the sealant formed by curing the composition. For example, when the composition will be used in an IG application, the application temperature range may be the temperature range at which the composition will be applied or interposed between glass panes. The application temperature range will depend on various factors including the IG unit fabricator's particular fabrication process. Precipitated calcium carbonate may be used as ingredient (D) when the application temperature ranges from 80° C. to 120° C., alternatively 90° C. to 110° C., and alternatively 90° C. to 100° C. However, when the composition is prepared on a continuous (e.g., twin-screw) compounder, the ingredients may be compounded at a temperature 20° C. to 30° C. above the application temperature range for a short amount of time. Therefore, ingredient (D) is selected to ensure that not all of the water content is released during compounding, however ingredient (D) releases a sufficient amount of water to cure the composition when exposed to the application temperature range for a sufficient period of time. Precipitated calcium carbonate is available from Solvay under the trademark WINNOFIL® SPM. The water release agent selected will depend on various factors including the other ingredients selected for the composition, including catalyst type and amount; and the process conditions during compounding, packaging, and application. In a twin-screw compounder residence time may be less than a few minutes, typically less than 1-2 minutes. The ingredients are heated rapidly because the surface/volume ratio in the barrels and along the screw is high and heat is induced by shearing the ingredients. How much water is removed from ingredient (D) depends on the water binding capabilities, the temperature, the exposure time (duration), and the level of vacuum used to strip the material passing through the compounder. Even with compounding temperatures of up to 200° C. and full operational vacuum stripping, there remains enough water on precipitated $CaCO_3$ to cure the composition, after ca. 3 weeks ambient storage, when exposed afterwards at 90° C. for ca. 30 minutes. Without wishing to be bound by theory, it is thought that with a twin screw compounding temperature of 120° C. there will remain enough water on the precipitated $CaCO_3$ to cure the composition over a period of 1-2 weeks at room temperature when the composition has been applied at 90° C. The amount of ingredient (D) in the composition depends on various factors including the selection of ingredients (A), (B) and (C) and whether any optional ingredients are present, however the amount of ingredient (D) may range from 5 to 30 parts based on the weight of the composition. Without wishing to be bound by theory, it is thought that if the amount of ingredient (D) is less than 5 weight parts based on 100 weight parts of the composition, then ingredient (D) may contain insufficient water to cure the composition.

The present inventors surprisingly found that the composition of this invention will cure in the presence of ingredient (C) the drying agent when the water source is present. Without wishing to be bound by theory, it is thought that when the composition is used in applications such as an IG unit, the low moisture permeability imparted by ingredient (A) (and ingredient (F), if present) may prevent the composition from curing by exposure to atmospheric moisture within a reasonable period of time. Ingredient (D) is added to address this problem. Without wishing to be bound by theory, it is thought when the composition is heated to the application temperature, the heat will liberate the water, the water will react with the hydrolyzable groups on ingredient (A) to cure the composition, and any by-products such as alcohols and/or water left in the composition may be bound by ingredient (C), thereby allowing the condensation reaction (which is an equilibrium reaction) to proceed toward completion and preventing condensation of cure by-products, for example, between panes in an IG unit (known as "chemical fogging").

For purposes of this application, ingredient (D) the water release agent may exclude liquid water, hydrated metal salts such as those disclosed by U.S. Pat. No. 6,025,445, and combinations thereof. Without wishing to be bound by theory, it is thought that adding liquid water to the composition may form steam during the compounding process to make the composition, during the application process of the composition to a substrate, or both. Without wishing to be bound by theory, it is thought that hydrated metal salts may have a negative effect on the adhesion of composition, especially when the adhesion needs to withstand environmental conditions that include water or water vapor.

Ingredient (E) Filler

The composition may optionally further comprise additional ingredient (E). Ingredient (E) is a filler other than ingredients (C) and (D). Ingredient (E) generally does not significantly impact the amount of water present during and after curing the composition. Ingredient (E) may comprise a reinforcing filler, an extending filler, a thixotropic filler, a pigment, or a combination thereof. One skilled in the art would be able to select suitable additional fillers without undue experimentation. Examples of suitable additional fillers include, but are not limited to, ground calcium carbonate, carbon black, fumed silica, precipitated silica, talc, titanium dioxide, plastic powders, glass or plastic (such as Saran™) microspheres, high aspect ratio fillers such as mica or exfoliated mica, and combinations thereof. The filler may optionally be treated with a treating agent, such as a fatty acid (e.g., stearic acid).

Suitable fillers are known in the art and are commercially available. Ground calcium carbonate is available from QCI Britannic of Miami, Fla., U.S.A. under the trademark Imerys Gammasperse. Carbon black, such as 1011, is commercially available from Williams. Silica is commercially available from Cabot Corporation.

The amount of ingredient (E) in the composition depends on various factors including the specific water release agent selected and whether any additional fillers are present. However, the amount of ingredient (E) may range from 0 parts to 30 parts, alternatively 5 parts to 30 parts, based on the weight of the composition. Ingredient (E) may be one filler. Alternatively, ingredient (E) may comprise two or more fillers that differ in at least one of the following properties: composition, particle size, and surface treatment.

Ingredient (F) Non-Reactive Binder

Ingredient (F) is a non-reactive, elastomeric, organic polymer, i.e., an elastomeric organic polymer that does not react with ingredient (A). Ingredient (F) is compatible with ingredient (A), i.e., ingredient (F) does not form a two-phase system with ingredient (A). Ingredient (F) may have sufficiently low gas and moisture permeability, for example, if the composition will be used in an IG application. Ingredient (F) may have Mn ranging from 30,000 to 75,000. Alternatively, ingredient (F) may be a blend of a higher molecular weight, non-reactive, elastomeric, organic polymer with a lower molecular weight, non-reactive, elastomeric, organic polymer. In this case, the higher molecular weight polymer may have Mn ranging from 100,000 to 600,000 and the lower molecular weight polymer may have Mn ranging from 900 to 10,000, alternatively 900 to 3,000. The value for the lower end of the range for Mn may be selected such that ingredient (F) has compatibility with ingredient (A) and the other ingredients of the composition to minimize chemical fogging in an IG unit in which the composition will be used.

Ingredient (F) may comprise a polyisobutylene. Polyisobutylenes are known in the art and are commercially available. Examples suitable for use as ingredient (F) include polyisobutylenes marketed under the trademark OPPANOL® by BASF Corporation of Germany. Such polyisobutylenes are summarized in the table below.

| OPPANOL® | Mw | Mw/Mn | Mn | Mv | Viscosity (@150 C.) |
|---|---|---|---|---|---|
| B10 | 36,000 | 3 | 12,000 | 40,000 | 40,000 |
| B11 | 46,000 | 3.2 | 14,375 | 49,000 | 100,000 |
| B12 | 51,000 | 3.2 | 15,938 | 55,000 | 150,000 |
| B13 | 60,000 | 3.2 | 18,750 | 65,000 | 250,000 |
| B14 | 65,000 | 3.3 | 19,697 | 73,000 | 450,000 |
| B15 | 75,000 | 3.4 | 22,059 | 85,000 | 750,000 |
| B30 |  |  |  | 73,000 | 200,000 |
| B50 |  |  |  | 120,000 | 400,000 |
| B80 |  |  |  | 200,000 | 800,000 |
| B100 |  |  |  | 250,000 | 1,100,000 |
| B150 |  |  |  | 425,000 | 2,600,000 |
| B200 |  |  |  | 600,000 | 4,000,000 |

Other polyisobutylenes include different Parleam grades such as highest molecular weight hydrogenated polyisobutene PARLEAM® SV (POLYSYNLANE SV) from NOF CORPORATION Functional Chemicals & Polymers Div., Yebisu Garden Place Tower, 20-3 Ebisu 4-chome, Shibuya-ku, Tokyo 150-6019, Japan (Kinematic Viscosity (98.9° C.) 4700). Other polyisobutylenes are commercially available from ExxonMobil Chemical Co. of Baytown, Tex., U.S.A. and include polyisobutylenes marketed under the trademark VISTANEX®, such as ML-80, MML-100, MML-120, and MML-140. VISTANEX® polyisobutylenes are paraffinic hydrocarbon polymers, composed of long, straight-chain macromolecules containing only chain-end olefinic bonds. VISTANEX® MM polyisobutylenes have viscosity average molecular weight ranging from 70,000 to 90,000. Lower molecular weight polyisobutylenes include VISTANEX® LM, such as LM-MS (viscosity average molecular weight ranging from 8,700 to 10,000 also made by ExxonMobil Chemical Co.) and VISTANEX LM-MH (viscosity average molecular weight of 10,000 to 11,700) as well as Soltex PB-24 (Mn 950) and Indopol®D H-100 (Mn 910) and Indopol® H-1200 (Mn 2100) from Amoco. Other polyisobutylenes are marketed under the trademarks NAPVIS® and HYVIS® by BP Chemicals of London, England. These polyisobutylenes include NAPVIS® 200, D10, and DE3; and HYVIS® 200. The NAPVIS® polyisobutylenes may have Mn ranging from 900 to 1300. Alternatively, ingredient (F) may comprise butyl rubber. Alternatively, ingredient (F) may comprise a styrene-ethylene/butylene-styrene (SEBS) block copolymer, a styrene-ethylene/propylene-styrene (SEPS) block copolymer, or a combination thereof. SEBS and SEPS block copolymers are known in the art and are commercially available as Kraton® G polymers from Kraton Polymers U.S. LLC of Houston, Tex., U.S.A., and as Septon polymers from Kuraray America, Inc., New York, N.Y., U.S.A. Alternatively, ingredient (F) may comprise a polyolefin plastomer. Polyolefin plastomers are known in the art and are commercially available as AFFINITY® GA 1900 and AFFINITY® GA 1950 from Dow Chemical Company, Elastomers & Specialty Products Division, Midland, Mich., U.S.A.

The amount of ingredient (F) range from 0 parts to 50 parts, alternatively 10 parts to 40 parts, and alternatively 5 parts to 35 parts, based on the weight of the composition. Ingredient (F) may be one non-reactive, elastomeric, organic polymer. Alternatively, ingredient (F) may comprise two or more non-reactive, elastomeric, organic polymers that differ in at least one of the following properties: structure, viscosity, average molecular weight, polymer units, and sequence.

Ingredient (G) Crosslinker

Ingredient (G) is a crosslinker. Ingredient (G) may be a silane, an oligomeric reaction product of the silane, or a combination thereof. Alkoxysilane crosslinkers may have the general formula $R^1{}_a SiR^2{}_{(4-a)}$, where each $R^1$ is independently a monovalent organic group such as an alkyl group, alkenyl group, or aryl group; each $R^2$ is a hydrolyzable group; and a is 1, 2, or 3. Oligomeric crosslinkers may have the general formula $R^1Si(OSi(R^2)_3)_3$, where $R^1$ and $R^2$ are as described above.

In the formulae above, suitable monovalent organic groups for $R^1$ include, but are not limited to, monovalent substituted and unsubstituted hydrocarbon groups. Examples of monovalent unsubstituted hydrocarbon groups for $R^1$ include, but are not limited to, alkyl such as methyl, ethyl, propyl, pentyl, octyl, undecyl, and octadecyl; cycloalkyl such as cyclohexyl; alkenyl such as vinyl, allyl, and propenyl; aryl such as phenyl, tolyl, xylyl, benzyl, and 2-phenylethyl. Examples of monovalent substituted hydrocarbon groups for $R^1$ include, but are not limited to, monovalent halogenated hydrocarbon groups such as chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocycliopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of monovalent substituted hydrocarbon groups for $R^1$ include, but are not limited to, hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^1$ may be an alkyl group, alkenyl group, or aryl group.

Each $R^2$ may be independently selected from an alkoxy group; an alkenyloxy group; an amido group, such as an acetamido, a methylacetamido group, or benzamido group; an acyloxy group such as acetoxy; an amino group; an aminoxy group; a hydroxyl group; a mercapto group; an oximo group, and a ketoximo group. Alternatively, each $R^2$ may be an alkoxy group. Suitable alkoxy groups for $R^2$ include, but are not limited to, methoxy, ethoxy, propoxy, and butoxy.

Ingredient (G) may comprise an alkoxysilane exemplified by a dialkoxysilane, such as a dialkyldialkoxysilane or a trialkoxysilane, such as an alkyltrialkoxysilane or alkenyltrialkoxysilane, or partial or full hydrolysis products thereof, or another combination thereof. Examples of suitable trialkoxysilanes include methyltrimethoxysilane, methyltriethoxysilane, ethyltrimethoxysilane, ethyltriethoxysilane, phenyltriethoxysilane, phenyltrimethoxysilane, vinyltrimethoxysilane, vinyltriethoxysilane, and a combination thereof. Examples of alkoxysilane crosslinkers are disclosed in U.S. Pat. Nos. 4,962,076; 5,051,455; and 5,053,442.

Alternatively, ingredient (G) may comprise a dialkoxysilane selected from chloromethylmethyldimethoxysilane, chloromethylmethyldiethoxysilane, dimethyldimethoxysilane, methyl-n-propyldimethoxysilane, (2,2-dichlorocyclopropyl)-methyldimethoxysilane, (2,2-difluorocyclopropyl)-methyldiethoxysilane, (2,2-dichlorocyclopropyl)-methyldiethoxysilane, fluoromethyl-methyldiethoxysilane, fluoromethyl-methyldimethoxysilane, or a combination thereof.

Alternatively, ingredient (G) may comprise a trialkoxysilane selected from methyltrimethoxysilane, ethyltrimethoxysilane, propyltrimethoxysilane, isobutyltrimethoxysilane, cyclopentyltrimethoxysilane, hexyltrimethoxysilane, phenyltrimethoxysilane, 2-ethyl-hexyltrimethoxysilane, 2,3-dimethylcyclohexyltrimethoxisIane, glycidoxypropyltrimethoxysilane, aminoethylaminopropyltrimethoxysilane, (ethylenediaminepropyl)trimethoxysilane, 3-methacryloxypropyltrimethoxysilane, chloromethyltrimethoxysilane, 3-chloropropyltrimethoxysilane, trichlorophenyltrimethoxysilane, 3,3,3-trifluoropropyl trimethoxysilane, 4,4,4,3,3-pentafluorobutyltrimethoxysilane, 2,2-difluorocyclopropyl-triethoxysilane, methyltriethoxysilane, cyclohexyltriethoxysilane, chloromethyltriethoxysilane, tetrachlorophenyltriethoxysilane, fluoromethyltriethoxysilane, methyltriisopropoxysilane, methyl-tris(methoxyethoxy)silane, n-propyl-tris(3-methoxyethoxy)silane, phenyltris-(methoxyethoxy)silane, vinyltrimethoxysi lane, vinyltriethoxysilane, or a combination thereof.

Alternatively, ingredient (G) may comprise a tetraalkoxysilane selected from tetraethoxysilane, tetrapropoxysilane, tetrabutoxysilane, or a combination thereof.

The amount of ingredient (G) depends on the specific crosslinker selected. However, the amount of ingredient (G) may range from 0 parts to 5 parts, alternatively 0.1 parts to 5 parts, based on the weight of the composition. Ingredient (G) may be one crosslinker. Alternatively, ingredient (G) may comprise two or more different crosslinkers.

Ingredient (G) may comprise an acyloxysilane, such as an acetoxysilane. Acetoxysilanes include a tetraacetoxysilane, an organotriacetoxysilane, a diorganodiacetoxysilane, or a combination thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Alternatively, ingredient (G) may comprise organotriacetoxysilanes, for example mixtures containing methyltriacetoxysilane and ethyltriacetoxysilane.

Alternatively, ingredient (G) may comprise a ketoximosilane. Examples of ketoximosilanes for ingredient (G) include, but are not limited to, tetra(methylethylketoximo)silane, methyl-tris-(methylethylketoximo)silane, vinyl-tris-(methylethylketoximo)silane, and combinations thereof.

Alternatively, ingredient (G) may comprise a disilane of formula $R^4_3Si\text{-}D\text{-}SiR^4_3$, where $R^4$ and D are as described herein. Examples of such disilanes include bis(triethoxysilyl)hexane), 1,4-bis[trimethoxysilyl(ethyl)]benzene, and bis[3-(triethoxysilyl)propyl]tetrasulfide, as described in, e.g., U.S. Pat. No. 6,130,306.

Ingredient (H) Chemical Drying Agent

Alternatively, an amount of a crosslinker added to the composition in addition to ingredient (G) may function as a chemical drying agent. Without wishing to be bound by theory, it is thought that the chemical drying agent may be added to the dry part of a multiple part composition to keep the composition free from water and to assist in binding water coming from ingredient (D) after the parts of the composition are mixed together. For example, alkoxysilanes suitable as drying agents include vinyltrimethoxysilane, vinyltriethoxysilane, and combinations thereof.

The amount of ingredient (H) depends on the specific drying agent selected. However, the amount of ingredient (H) may range from 0 parts to 5 parts, alternatively 0.1 parts to 0.5 parts. Ingredient (H) may be one chemical drying agent. Alternatively, ingredient (H) may comprise two or more different chemical drying agents.

Ingredient (I) Adhesion Promoter

Ingredient (I) is an adhesion promoter. Ingredient (I) may be an organofunctional silane other than ingredient (G). The organofunctional silane may have the general formula $R^3{}_b SiR^4{}_{(4-b)}$, where each $R^3$ is independently a monovalent organic group; each $R^4$ is an alkoxy group; and b is 0, 1, 2, or 3, alternatively b may be 0 or 1.

Alternatively, the adhesion promoter may comprise an organofunctional silane having the formula $R^5{}_c R^6{}_d Si(OR^5)_{4-(c+d)}$ where each $R^5$ is independently a substituted or unsubstituted, monovalent hydrocarbon group having at least 3 carbon atoms and each $R^6$ contains at least one SiC bonded group having an adhesion-promoting group, such as amino, epoxy, mercapto or acrylate groups, c has the value of 0 to 2 and d is either 1 or 2 and the sum of c+d is not greater than 3. The adhesion promoter can also be a partial condensate of the above silane.

Examples of ingredient (I) include a trialkoxysilane such as gamma-aminopropyltriethoxysilane, (ethylenediaminepropyl)trimethoxysilane, vinyltriethoxysilane, (methacryloxypropyl)trimethoxysilane, vinyltrimethoxysilane; and a tetraalkoxysilane such as tetraethoxysilane; and combinations thereof.

Alternatively, ingredient (I) may comprise a dialkoxysilane such as vinyl,methyl,dimethoxysilane; vinyl,methyl,diethoxysilane; vinyl,ethyl,dimethoxysilane; vinyl,ethyl,diethoxysilane; or a combination thereof.

Alternatively, ingredient (I) may comprise a trialkoxysilane selected from glycidoxypropyltrimethoxysilane, aminoethylaminopropyltrimethoxysilane, (ethylenediaminepropyl)trimethoxysilane, 3-methacryloxypropyltrimethoxysilane, vinyltrimethoxysilane, vinyltriethoxysilane, or a combination thereof.

Alternatively, ingredient (I) may comprise a tetraalkoxysilane selected from tetraethoxysilane, tetrapropoxysilane, tetrabutoxysilane, or a combination thereof.

Alternatively, ingredient (I) may comprise a reaction product of an epoxy-functional silane and an amino-functional silane, described above, and as exemplified by those disclosed in U.S. Pat. Nos. 4,602,078 and 5,405,889. Alternatively, ingredient (I) may comprise a silatrane derivative derived from an epoxy-functional silane and an amine compound as exemplified by those in U.S. Pat. No. 5,936,110.

Alternatively, ingredient (a) may comprise a disilane of formula $R^4{}_3 Si\text{-}D\text{-}SiR^4{}_3$, where $R^4$ and D are as described above. Examples of such disilanes include bis(triethoxysilyl) hexane), 1,4-bis[trimethoxysilyl(ethyl)]benzene, and bis[3-(triethoxysilyl)propyl]tetrasulfide, as described in, e.g., U.S. Pat. No. 6,130,306.

The amount of ingredient (I) depends on the specific adhesion promoter selected. One skilled in the art would recognize that certain examples for ingredients (G) and (I) may have both crosslinking and adhesion promoting properties. One skilled in the art would recognize that the amount of ingredient (I) added to the composition is in addition to the amount of ingredient (G), and that when ingredient (I) is added, the adhesion promoter selected may be the same as or different from the crosslinker. However, the amount of ingredient (I) may range from 0 parts to 5 parts, alternatively 0 parts to 2 parts, and alternatively 0.5 parts to 1.5 parts, based on the weight of the composition. Ingredient (I) may be one adhesion promoter. Alternatively, ingredient (I) may comprise two or more different adhesion promoters.

Organofunctional alkoxysilane crosslinkers and adhesion promoters are known in the art and commercially available. For example, vinyltriethoxysilane, vinyltrimethoxysilane, phenyltrimethoxysilane, tetraethoxysilane, isobutyltrimethoxysilane, (ethylenediaminepropyl)trimethoxysilane, and (methacryloxypropyl)trimethoxysilane are available from Dow Corning Corporation of Midland, Mich., U.S.A. Aminopropyltriethoxysilane and gamma-isocyanopropyltriethoxysilane are available from under the designation SILQUEST® (A-1100 and A-1310, respectively) from Momentive Performance Materials, 187 Danbury Road, Wilton, Conn. USA.

One skilled in the art would recognize when selecting ingredients (G), (H), and (I) that there may be overlap between crosslinker (affecting the physical properties of the cured product), adhesion promoter (affecting the adhesion of the cured product), and chemical drying agent (affecting shelf-stability). One skilled in the art would be able to distinguish among and select ingredients (G), (H), and/or (I) based on various factors including the intended use of the composition and whether the composition will be prepared as a one-part or multiple-part composition.

Ingredient (J) Microcrystalline Wax

Ingredient (J) is a microcrystalline wax that is a solid at 25° C. (wax). The melting point may be selected such that the wax has a melting point at the low end of the desired application temperature range. For example, when the composition will be used in an IG unit, the wax may have a melting point ranging from 80 to 100° C. Without wishing to be bound by theory, it is thought that ingredient (J) acts as a process aid that improves flow properties while allowing rapid green strength development (i.e., a strong increase in viscosity, corresponding to increase in the load carrying capability of a seal prepared from the composition, with a temperature drop) upon cooling the composition a few degrees, for example, after the composition is applied to a substrate. Without wishing to be bound by theory, it is thought that incorporation of wax may also facilitate incorporation of fillers, compounding and deairing (during production of the composition), and mixing (static or dynamic mixing during application of both parts of a two-part composition). It is thought that the wax, when molten, serves as a process aid, substantially easing the incorporation of filler in the sealant during compounding, the compounding process itself, as well as the deairing step. The wax, with a melt temperature below 100° C., may facilitate mixing of the two parts of a two part sealant composition before application, even in a simple static mixer. The wax may also facilitate application of the sealant at temperatures ranging from 80° C. to 110° C., alternatively 90° C. to 100° C. with good rheology.

Waxes suitable for use as ingredient (J) may be non-polar hydrocarbons. The waxes may have branched structures, cyclic structures, or combinations thereof. For example, petroleum microcrystalline waxes are available from Strahl & Pitsch, Inc., of West Babylon, N.Y., U.S.A. and include SP 96 (melting point ranging from 62 IC to 69° C.), SP 18 (melting point ranging from 73° C. to 80° C.), SP 19 (melting point ranging from 76° C. to 83° C.), SP 26 (melting point ranging from 76° C. to 83° C.), SP 60 (melting point ranging from 79° C. to 85° C.), SP 617 (melting point ranging from 88° C. to 93° C.), SP 89 (melting point ranging from 90° C. to 95° C.), and SP 624 (melting point ranging from 90° C. to 95° C.). Other petroleum microcrystalline waxes include waxes marketed under the trademark Multiwax® by Crompton Corporation of Petrolia, Pa., U.S.A. These waxes include 180-W, which comprises saturated branched and cyclic non-polar hydrocarbons and has melting point ranging from 79° C. to 87° C.; Multiwax® W445, which comprises saturated branched and cyclic non-polar hydrocarbons, and has melting point ranging from 76° C. to 83° C.; and Multiwax® W-835, which comprises saturated branched and cyclic non-polar hydrocarbons, and has melting point ranging from 73° C. to 80° C.

The amount of ingredient (J) depends on various factors including the specific wax selected and the selections of ingredients (C) and (D) and ingredient (E), if present. However, the amount of ingredient (J) may range from 0 parts to 20 parts, alternatively 1 parts to 15 parts, and alternatively 1 parts to 5 parts based on the weight of the composition. Ingredient (J) may be one wax. Alternatively, ingredient (J) may comprise two or more different waxes.

Ingredient (K) Anti-Aging Additive

Ingredient (K) is an anti-aging additive. Ingredient (K) may comprise an antioxidant, a UV absorber, a UV stabilizer, a heat stabilizer, or a combination thereof. Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl sebacate; and a combination thereof (TINUVIN® 272). These TINUVIN® additives are commercially available from Ciba Specialty Chemicals of Tarrytown, N.Y., U.S.A. Suitable antioxidants are known in the art and commercially available. Suitable antioxidants include phenolic antioxidants and combinations of phenolic antioxidants with stabilizers. Phenolic antioxidants include fully sterically hindered phenols and partially hindered phenols. Stabilizers include organophosphorous derivatives such as trivalent organophosphorous compound, phosphites, phosphonates, and a combination thereof; thiosynergists such as organosulfur compounds including sulfides, dialkyldithiocarbamate, dithiodipropionates, and a combination thereof; and sterically hindered amines such as tetramethyl-piperidine derivatives. Suitable antioxidants and stabilizers are disclosed in Zweifel, Hans, "Effect of Stabilization of Polypropylene During Processing and Its Influence on Long-Term Behavior under Thermal Stress," Polymer Durability, Ciba-Geigy AG, Additives Division, CH-4002, Basel, Switzerland, American Chemical Society, vol. 25, pp. 375-396, 1996. Suitable phenolic antioxidants include vitamin E and IRGANOX® 1010 from Ciba Specialty Chemicals, U.S.A. IRGANOX® 1010 comprises pentaerythritol tetrakis(3-(3,5-di-t-butyl-4-hydroxyphenyl)propionate). Oligomeric (higher molecular weight) stabilizers may be used to minimize potential for chemical fogging of IG units and migration. Example of an oligomeric antioxidant stabilizer (specifically, hindered amine light stabilizer (HALS)) is Ciba Tinuvin 622 is a dimethylester of butanedioic acid copolymerized with 4-hydroxy-2,2,6,6-tetramethyl-1-piperidine ethanol.

The amount of ingredient (K) depends on the specific anti-aging additive selected. However, the amount of ingredient (K) may range from 0 parts to 5 parts, alternatively 0.5 parts to 3 parts, based on the weight of the composition. Ingredient (K) may be one anti-aging additive. Alternatively, ingredient (K) may comprise two or more different anti-aging additives.

Ingredient (L) Tackifying Agent

Suitable tackifying agents are known in the art. For example, the tackifying agent may comprise an aliphatic hydrocarbon resin such as a hydrogenated polyolefin having 6 to 20 carbon atoms, a hydrogenated terpene resin, a rosin ester, a hydrogenated rosin glycerol ester, or a combination thereof. Tackifying agents are commercially available. Aliphatic hydrocarbon resins are exemplified by ESCOREZ 1102, 1304, 1310, 1315, and 5600 from Exxon Chemical and Eastotac resins from Eastman, such as Eastotac H-100 having a ring and ball softening point of 100° C., Eastotac H-115E having a ring and ball softening point of 115° C., and Eastotac H-130L having a ring and ball softening point of 130° C. Hydrogenated terpene resins are exemplified by Arkon P 100 from Arakawa Chemicals and Wingtack 95 from Goodyear. Hydrogenated rosin glycerol esters are exemplified by Staybelite Ester 10 and Foral from Hercules, Examples of commercially available polyterpenes include Piccolyte A125 from Hercules. Examples of aliphatic/aromatic or cycloaliphatic/aromatic resins include ECR 149B or ECR 179A from Exxon Chemical.

In addition, up to 20 parts by weight, alternatively 10 parts by weight, based on the weight of ingredient (L) of a solid tackifying agent (i.e., a tackifying agent having a ring and ball softening point above 25° C.), which is compatible with ingredients (A) and (F). Suitable tackifying agents include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrenelterpene; (4) polyterpene resins having a softening point, as determined by ASTM method E28,58T, ranging from 60° C. to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a ring and ball softening point ranging from 60° C. to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

The amount of ingredient (L) depends on various factors including the specific tackifying agent selected and the selection of ingredient (I). However, the amount of ingredient (L) may range from 0 parts to 20 parts based on the weight of the composition. Ingredient (L) may be one tackifying agent. Alternatively, ingredient (L) may comprise two or more different tackifying agents.

Preparation of the Composition

The process may be either a batch compounding process or a continuous compounding process. A continuous compounding process may allow for better control of stripping conditions and may minimize duration of heat exposure of the composition, thereby improving control of the water content of the composition. Without wishing to be bound by theory, it is thought that improving control of the water content allows for improved curing of the composition.

The composition of this invention may be formulated as a one-part composition or a multiple-part composition, such as a two-part composition. A one-part composition may be prepared by a process comprising mixing the ingredients under shear. The ingredients may be mixed under vacuum or a dry inert gas, or both. The ingredients may be mixed under ambient or elevated temperature, or a combination thereof.

A one-part composition may be prepared by heating ingredients (A) and (F), and ingredient (J), if present, before adding ingredients (D) and (C). After combining these ingredients at elevated temperature, ingredient (B) and additional ingredients such as (E), (G), (H), (I), (K), and (L) if any, may be added. Alternatively, ingredients (E) and (J) may be combined, and thereafter ingredients (A), (F), (G), (E), (H), (I), (C), and (B) may then be added.

Alternatively, the composition may be prepared as a multiple-part composition, such as the two-part composition described below. One skilled in the art would recognize how to prepare a multiple-part composition by storing ingredient (B) the condensation catalyst and ingredient (D) the water release agent in separate parts. An exemplary two-part composition comprises a wet (water containing) part and a dry part. The wet part may be prepared by mixing under shear ingredients comprising (F) a non-reactive, elastomeric, organic polymer, and (D) a water release agent, and one or more of the following optional ingredients: (J) wax, (L) tackifying agent, (E) filler such as reinforcing filler (e.g., carbon black), extending filler, or both.

The dry part may be prepared by mixing under shear ingredients comprising (A) a moisture-curable, silane-functional, elastomeric, organic polymer, (F) a non-reactive, elastomeric, organic polymer, (B) a condensation catalyst; (C) a drying agent, and one or more of the following optional ingredients: (J) wax, (L) tackifying agent, (G) crosslinker (H) chemical drying agent, (K) stabilizer, and (I) adhesion promoter.

Alternatively, the wet part may be prepared by mixing under shear ingredients comprising (A) a moisture-curable, silane-functional, elastomeric, organic polymer, (F) a non-reactive, elastomeric, organic polymer, and (D) a water release agent. When the wet part comprises the ingredient (A) care must be taken that none of the other ingredients in the wet part unintentionally may act as a condensation catalyst. In this case, consideration should to be given to the nature of the water release agent (D). The dry part may be prepared by mixing under shear ingredients comprising (A) a moisture-curable, silane-functional, elastomeric, organic polymer and (B) a condensation catalyst, (C) a physical drying agent, optionally (G) a crosslinker, optionally (H) a chemical drying agent, optionally (I) an adhesion promoter, and. Each of the wet part and the dry part may optionally further comprise one or more additional ingredients selected from, (F) a non-reactive, elastomeric, organic polymer, (J) a microcrystalline wax, which is a solid at 25° C., (K) an anti-aging additive, and (L) a tackifying agent.

The process conditions of shear and heating are selected such that an amount of water sufficient to cure the composition remains in ingredient (D) the water release agent during compounding operation to prepare the composition. To achieve sufficient homogeneous mixing during this Operation (especially in terms of the polymers and the powder components, e.g., drying agent and water release agent, one skilled in the art may choose a compounding temperature close to the application temperature, so that the polymer components are sufficiently liquid to allow efficient incorporation of the powder components. However, because of the mechanical shear required for this operation, the actual compounding temperature often will be substantially above the application temperature. For instance, when manufacturing the composition with a twin-screw compounder, temperature may run 20 to 30° C. above the application temperature (e.g., 110 to 120° C. when the composition will be applied at 80 to 100° C. in an IG unit) and sometimes as high as 100 to 110° C. above the application temperature. While the composition is not exposed to this temperature for prolonged periods of time, the 'bound' water still needs to survive this compounding step. Without wishing to be bound by theory, it is thought that ingredient (D) is a water release agent in which the water is sufficiently tightly bound in order for sufficient amounts of water to survive the compounding step, while at the same time, the water is bound insufficiently tightly to prevent a sufficient quantity of water to cure the composition at the application temperature to initiate cure.

Method of Use

Ingredient (A) allows the composition to cure via condensation reaction. Ingredients (A) and (F) are considered low permeability polymers, i.e., these polymers minimize moisture permeability and gas permeability of the cured product of the composition. Therefore, ingredient (D) a water release agent that releases water over an application temperature range is included in the composition to cure the composition. In a two-part composition, addition of a water release agent such as precipitated $CaCO_3$ to one part of the composition is a suitable means of inducing cure upon mixing of the two parts when the composition is heated to a temperature that releases a sufficient amount of water from ingredient (D). Since the composition is exposed to the application temperature in the application equipment only for a limited duration, the water release agent may be chosen such that it releases a sufficient amount of water to induce sufficiently fast cure, even after the composition has cooled down again after its application. For instance, when the composition is mixed at room temperature or below 40 to 60° C., the composition may cure too slowly for the industrial manufacturing process of IG units.

Figure 2:
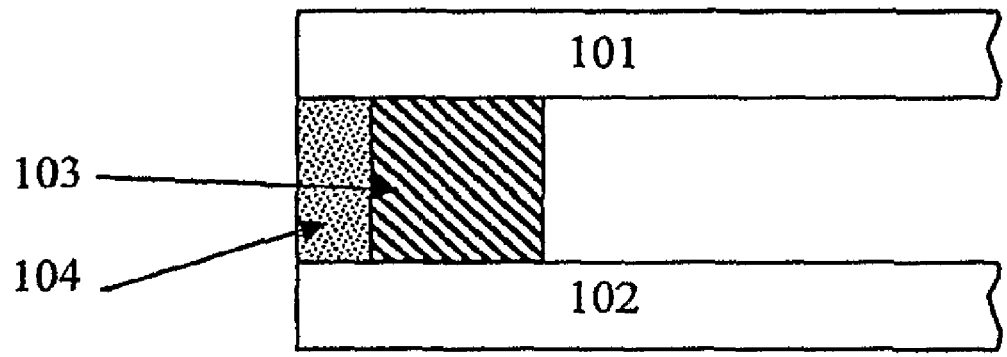
FIG. 2 is a partial cross section of an IG unit.

The composition of this invention may be used in IG applications. FIGS. 1 (single-seal) and 2 (dual-seal) are cross sectional views showing portions of IG units. Each IG unit comprises a first glass pane 101, a second glass pane 102 spaced a distance from the first glass pane 101. In FIG. 1, a cured product 103 of the composition described above is interposed in the interpane space between the first glass pane 101 and the second glass pane 102. The cured product 103 may act as an integrated edge-seal, i.e., acting as a water vapor barrier, a gas barrier, a sealant between the panes, a spacer, an adhesive, and a desiccant matrix. FIG. 2 shows the use of the cured product 103 of the composition described above as a primary sealant. A secondary sealant 104, such as a polysulfide, polyurethane, or silicone, is adhered to the primary sealant and the glass panes 101, 102. In the case of dual-seal (FIG. 2) the cured product 103 may act as an integrated edge-seal, i.e., acting as a water vapor barrier, a gas barrier, a sealant between the panes, a spacer, an adhesive, and a desiccant matrix. The secondary sealant 104 then further supports the sealing and bonding (adhesive) function of the cured product 103.

The process of applying the two-part composition may comprise melting the two parts and feeding them by suitable means (e.g., conventional equipment such as a hot melt pump or extruder) into a heated static or dynamic mixer and from there via a heated hose to an application nozzle. The process for applying the sealant from the nozzle onto the glass to form the edge-seal and for making the IG unit offers the advantages of employing the same or similar equipment currently used for making conventional TPS® IG units, with the exception that the equipment may be modified to handle two parts (dual feeds) when a two part composition is used, and the composition described above also allows manufacture of single seals. One process used to make TPS® units comprises applying the composition as a seal filament around the perimeter of a first glass pane, moving a second glass pane in parallel position in close proximity to the first glass pane, optionally filling the inter-pane volume with a gas (such as argon), and closing the IG unit by pressing the second glass pane against the filament seal formed on the first glass pane (see, for instance, EP 0,805,254 B1, WO 95/11,363, WO 96/09,456). Alternatively, the glass panes may be held in a parallel, spaced position and the composition extruded between the glass panes (see WO 90/02,696), or the composition may be first extruded onto a support to which the composition adheres less well than to glass, then the composition is transferred from the support onto one glass pane, both glass panes are made to coincide and are then pressed together (see WO 95/11,364).

The IG unit may be prepared by a process comprising i) bringing the first glass pane 101 and the second glass pane 102 into a parallel position spaced apart by an interpane space, ii) applying the composition described above into the interpane space along the perimeter of the first glass pane 101 and the second glass pane 102, and iii) curing the composition.

Alternatively, the IG unit may be prepared by a process comprising: i) applying the composition described above as a filament seal around the perimeter of the first glass pane 101, ii) moving the second glass pane 102 into a parallel position to the first glass pane 101 such that the first glass pane 101 and the second glass pane 102 are spaced apart by an interpane space, optionally iii) filling the interpane space with a gas such as argon or dry air, iv) pressing the second glass pane 102 against the filament seal formed on the first glass pane 101, and v) curing the composition.

Alternatively, the IG unit may be prepared by a process comprising: i) applying a composition described above as a filament seal onto a support to which the composition adheres less well than to glass, ii) transferring the filament seal from the support onto the first glass pane 101, iii) pressing the first glass pane 101 and the second glass pane 102 together in a parallel position, and iv) curing the composition.

In any of the processes for preparing the IG unit, a one-part or a two-part composition described above may be used. When a two-part composition is used, the two parts may be mixed shortly before process step i) or process step ii). These processes for preparing the IG unit may offer the advantage that curing the composition may be performed in the absence of atmospheric moisture. For purposes of this application, "absence of atmospheric moisture" means that any amount of moisture present in the ambient atmosphere is insufficient to cure of this invention within a time period of 3 to 4 weeks. Curing may be performed by heating the composition to the application temperature range, thereby releasing water from ingredient (D). Curing may be performed during or after application of the composition to a glass pane. In the processes for preparing the IG unit, applying the composition may be performed at a temperature ranging from 80° C. to 140° C. Curing may be performed at room temperature for 3 to 4 weeks to reach 80% of the final properties.

EXAMPLES

The following examples are included to demonstrate the invention to those of ordinary skill in the art. However, those of skill in the art should, in light of the present disclosure, appreciate that many changes can be made in the specific embodiments which are disclosed and still obtain a like or similar result without departing from the spirit and scope of the invention set forth in the claims. All amounts, ratios, and percentages are by weight unless otherwise indicated. The ingredients described in Table 1 were used in the following examples.

TABLE 1

Ingredient Information

| Ingred. | Chemical Name | Physical Properties, viscosity units are mPa · s | Commercial Source |
|---|---|---|---|
| (A1) | A silylated copolymer comprising a reaction product of isobutylene and paramethylstyrene with methylvinyl dimethoxysilane. | The silylated copolymer is a random polyisobutylene-p-methylstyrene copolymer grafted with vinyldimethoxysilane. The molecular weight of the polyisobutylene-p-methylstyrene ranges from 63,000 to 870,000 before grafting. After grafting, the molecular weight ranges from 28,000 to 33,000. Viscosity is 43600 @ 150° C. | Dow Corning Corporation, Midland, Michigan, U.S.A. |
| (B1) | Di-(n-butyl)tin bis-ketonate | | Acima Chemical Industries Metatin 740 |
| (B2) | Di-n-Butyltin-di-Laurate (DBTDL) | | Acima Chemical Industries Metatin ® 712 |
| (C1) | 3 Å zeolite molecular sieve (dry) | Potassium aluminosilicate | UOP Molsiv 3A |
| (C2) | 4 Å molecular sieve (dry) | Sodium aluminosilicate (note: Alflexil 100 was dried at 260 C. for 2 hours to desorb water) | Alflexil 100 from A. E. Fischer Chemie GmbH & Co. KG of Wiesbaden, Germany |
| (C3) | 3 Å zeolite molecular sieve (dry) | Potassium aluminosilicate | Grace Davidson, Sylosiv 3A |
| (D1) | precipitated $CaCO_3$ treated with fatty acid (i.e., stearic acid) | Mean particle diameter: <0.1 μm, specific surface (BET): 20 $m^2$/g, coating content: 2.7 wt %, | Solvay Chemicals Winnofil SPM |
| (D2) | Hydrated 4 Å molecular sieve | Saturated sodium aluminosilicate | Ineos Doucil 4A from Ineos Silicas |
| (D3) | Hydrated 4 Å molecular sieve | Saturated sodium aluminosilicate | Alflexil 100 from A. E. Fischer Chemie GmbH & Co. KG |
| (E1) | Amorphous carbon black | Average particle size 0.05 μm, specific surface area: 44 $m^2$/g, Oil absorption: 120 (g/100 g) | Elementis Superjet Carbon Black LB-1011 or WMS 1011 |
| (E2) | Fine particle size, wet ground, ammonium stearate treated marble | Mean particle diameter: 3 um, surface area: 2 m2/g, treatment level: ~1 wt % | Imerys Marble Inc. Gama-Sperse ® CS-11 |
| (E3) | Untreated fumed silica | Surface area: 108 $m^2$/g | Cabot Corporation, Cab-O-Sil.L-90 |
| (F1) | Polyisobutylene | Average Mn is 950 Viscosity is 110 @ 120° C. | Soltex PB-24 |

TABLE 1-continued

Ingredient Information

| Ingred. | Chemical Name | Physical Properties, viscosity units are mPa · s | Commercial Source |
|---|---|---|---|
| (F2) | Polyisobutylene | Average Mn is 36,000 Viscosity is 40,000 @150° C. | BASF Oppanol B-10 |
| (F3) | Polyisobutylene | Average Mn is 51,000 Viscosity is 150,000 @150° C. | BASF Oppanol B-12 |
| (F4) | Polyisobutylene | Average Mn is 75,000 Viscosity is 700,000 @ 150° C. | BASF Oppanol B-15 |
| (F5) | Polyolefin Plastomer | Density of 0.874 g/ml, viscosity of 17,000 cps at 350° F. (177° C.) (by Brookfield spindle #31), and approximate melt index of 500. | Dow Chemical Company, Affinity GA 1950 POP |
| (F6) | Styrene/ethylene/propylene/styrene block copolymer (SEPS) | Density of 0.88 g/ml, Styrene content of 13 wt %, pellets | Kuraray America, Inc., Septon 2063 |
| (G1) | Vinyl triethoxysilane | | Dow Corning Corporation, Midland, Michigan, U.S.A. |
| (G2) | Vinyl trimethoxysilane | Bp 123° C. | Dow Corning Corporation, Midland, Michigan, U.S.A. |
| (G3) | Phenyltrimethoxysilane | | Dow Corning Corporation, Midland, Michigan, U.S.A. |
| (I1) | Tetraethylortho silicate (TEOS) | | Dow Corning Corporation, Midland, Michigan, U.S.A. |
| (I2) | Gamma-Aminopropyltriethoxysilane | | GE Silicones Silquest ® A-1100 Silane |
| (I3) | Methacryloxypropyl trimethoxysilane | | Dow Corning Corporation, Midland, Michigan, U.S.A. Z-6030 |
| (I4) | Ethylenediaminopropyltrimethoxy-silane | $H_2NC_2H_4NHC_3H_6$—$Si(OCH_3)_3$ | Dow Corning Corporation, Midland, Michigan, U.S.A. Z-6020 |
| (I5) | (Gamma-isocyanopropyl)triethoxysilane | | GE Silicones Silquest ® A-1310 Silane |
| (J1) | White, highly refined, high molecular weight microcrystalline petroleum wax; consists of saturated branched and cyclic non-polar hydrocarbons. | Melting Point, ° C. 79.4-86.7 ASTM D127 | Crompton Witco Multiwax 180-W |
| (J2) | microcrystalline petroleum wax | Melting Point ASTM D 127 88.3-92.7° C. | Strahl & Pitsch S&P 617 |
| (K1) | Mixture of 80% bis(1,2,2,6,6-pentamethyl-4-piperidinyl)sebacate and 20% methyl(1,2,2,6,6-pentamethyl-4-piperidinyl)sebacate (general-purpose liquid hindered-amine light stabilizer (HALS)) | | Ciba ® Tinuvin ® 292 |
| (K2) | 2-(2H-benzotriazol-2-yl)-6-dodecyl-4-methylphenol, branched and linear (benzotriazole type UV absorber) | | Ciba ® Tinuvin 571 |
| (L1) | Hydrogenated hydrocarbon tackifying resin made up of hydrogenated hydrocarbons having 6 to 20 carbon atoms | Ring and Ball softening point ranging from 95 to 105° C. Average Mn is 450 | Eastman Eastotac H100 |

Reference Example 1

Property Evaluation Methods

Ares Rheometer

The Ares rheometer was used in dynamic shear for cure profiling using the complex modulus components, and for viscosity and modulus build with time and temperature.

When doing a cure profiling, conditions used were geometry of 25 mm parallel plates, a frequency of 1 Hz and a temperature of 95° C. The software determined the point in time when G', storage modulus, crossed G", the loss modulus, i.e., G'=G" at this point. This time was then added to the time it took to get the material in the instrument and that overall time was considered the onset of cure. This point is often referred to as the gel point (Melt Rheology and Its Role in Plastics Processing, Dealy, J and Wissbrun, K, 1990 pg. 420) and a finite measurable point for the onset of cure.

The rheometer was also used to determine the extent of cure by placing cured samples between the plates taking care not to overload the weigh cells or transducer and then measuring G' values using 25 mm parallel plates and a frequency of 1 Hz at the desired temperatures.

Temperature sweeps of the samples were also done right after mix and days later to determine the solidification point and the effect of temperature on the viscosity of the fresh mixed material allowing for rheological profiling for mixing and clean out purposes. These were done with 25 mm parallel plates or 10 mm parallel plates and a frequency of 1 Hz for a temperature range from −20° C. to 145° C. depending on samples being tested.

Durometer—Hardness of the Material

The hardness of material was measured through a variation of ASTM D 2240. A Durometer Type A from Shore Instrument and Manufacturing with a Conveloader was used for testing material. Materials tested were generally 3 mm thick. In a separate set of tests it was shown that 3 mm thickness was sufficient for achieving reproducible results when placing the samples consistently on the Conveloader surface. As with any viscoelastic material, the samples showed a dependence of durometer measurement on the time of contact between the durometer pin and surface of the sample. This effect is believed to be primarily due to the wax contained in the sample. Samples were placed on the conveloader surface and the durometer head was allowed to fall at its predetermined rate due to the 1 kg weight. Due to the different nature of this sample, upon initial contact of the durometer needle with the surface a timer was started for 5 seconds. Shortly there after a high reading was seen on the instrument and recorded as initial value. Then after the 5 seconds had passed a second reading on the instrument was recorded as the 5 second value. A minimum of 3 readings was taken and the median value was reported of both the initial value and the 5 second value. In the cases where wax was in the sample, the durometer head generally left a hole that only returned to its original shape after heating the slab of sample, and the slab was cured prior to testing.

Adhesive (T/A) Joint Configurations

Adhesive (T/A) joint configurations were done to test adhesion between two glass substrates. The general assembly of the T/A joints with the compositions were done with molten sample and forced into the joints with the best void free sample after the sample was either mixed via a Hauschild mixer at 97° C., then deaired, and mixed again via a Hauschild mixer at 97° C., or the sample was prepared via the method outlined in the two part mixing by volume in the examples below. Dispensing and assembly of the T/A joints were done in a 95° C. hot workspace and/or high air flow oven that allowed material to be pressed or dispensed into the joint configuration in a manner that no air was trapped in the material. After assemblies were filled, they were allowed to coot to room temperature, but assemblies were often removed from the clamps anytime after they were cooled and green strength was obtained. Due to the adhesive nature of the samples, a piece of release liner was placed between the Teflon spacer and the sample for easy release of the sample from the assembly. Either upon curing or complete cooling, this release liner could then be removed. It was found enhanced release of the liner was possible when further cooling of the assemblies were done in a freezer and a fast pull of the release liner was done to remove it.

Adhesive (T/A) joint configurations with the commercial grade TPS material (non-reactive thermoplastic spacer/seal—comparative example 1) were also done, but assembly was slightly different by using pre-extruded material to create the 2"×0.5"×0.5" configuration. In this case three pieces of TPS were placed together. The TPS material (Koemmerling Koedimelt® TPS) was pressed into the configuration jig and then was heated at 120° C. for 30 minutes. The configuration was removed from the oven and the TPS material pressed into the glass configuration using an Arbor Press removing voids and ensuring good contact between the TPS and glass. The assembly was tightened, allowed to cool overnight and then disassembled and excess TPS trimmed away prior to testing sample since no cure time was necessary.

Swell Gel

Resistance to a solvent, toluene, commonly used to dissolve the materials in the uncured state was used to determine completion of cure. A sample was allowed to cure for 5 days after which a known weight was placed into a 1 ounce vial with toluene. Every few days the toluene was replaced with fresh toluene. After one week the sample was removed decanting off the bulk of solvent and then placing it into a pre-weighed dish for drying. The amount left after drying to a stable level was measured and compared to the weight of original sample to determine the amount of cured network of polymer, fillers and other curable materials.

Solvent Resistance

A small piece of sample, nominally 64 mm$^2$ by 3 mm thick, was placed in a 1 ounce vial and covered with toluene to see if the sample would dissolve. After a short time it was found samples had differing levels of solvation and a rating system was devised according to how black the mixture became due to the carbon black being freed upon polymer solvation. The rating system suggested a 0 value the "best" with material not solvated and the solvent staying clear, not turning black. Varying levels of gray to black were determined with 1 to 10 and 10 being a sample that is totally dissolved. These ratings were done at set intervals to differentiate cure and extent of cure with different compositions enabling multiple composition interactions to be differentiated in a shorter time. An evaluation value was determined after flipping the vial once and observing the color of the toluene.

Elastic Recovery

Elastic recovery was investigated using the idea of ASTM C 736-00, but changed for use with the samples looking to understand bulk properties over adhesive qualities when conducted at 95° C. The test was done on cured elastomer and TPS (comparative example). In all cases, the sample was pressed or cast into sheets. These sheets were then die-cut ("dog-bone" shaped specimens) to have a region of smaller cross sectional area and one of larger for attaching/clamping. In this case a die for cutting tensile samples was used in conjunction with an Arbor press and then the bar was cut in half to be used in the test. Test specimens were made for vertical testing in a 95° C. high air flow oven. A test sample was held in place with a mechanical clamp and masking tape between the sample and clamp to help dissipate the clamping pressure on the samples to prevent the mechanical clamp from crushing the sample causing premature failure at the attachment point. The original distance of the sample was measured and recorded as the original length. Clamped samples were placed in a high airflow oven, and samples alone were tested for heat resistance under the weight of the sample itself for a predetermined time, sometimes 20 hours. The samples were removed from the oven and let hang vertically until cool, where samples were again measured and recorded. Then these samples had a second clamp and weight attached. The weight was predetermined based on the cross-sectional area and the amount to provide a given force. This set up was then placed back in the 95° C. oven vertically for a set amount of time and then removed for cooling while in a vertical position. Upon cooling, the length was again measured. This number was used to derive a percent elongation as compared to the original length. Then the second clamp or bottom one was removed, and the sample was placed back in the oven for a 10 minute recovery time. Upon removal and cooling the sample length was again measured and then a comparison of this returned length could be done to the stretched length for a percent recovery or elastic recovery.

Deadload Testing

Deadload testing was done looking for the sample's ability to support a given weight for an extended period of time. Sample preparation was done in a similar manner to the elastic recovery just described, but clamped at both ends from the beginning. Length measurements are also done throughout the testing for elastic recovery measurements on these samples also. The test was done on cured samples. In all cases, samples were pressed or cast into sheets and allowed to cure for a given period of time, and in some cases a post cure was done for added strength. The samples were die-cut from a tensile die using an Arbor press and the region of smaller cross sectional area was used to determine the weight necessary to deliver the desired applied force, 2 psi and 3.45 psi, nominally 18.2 grams and 31.4 grams, respectively. Samples were set up with mechanical clamps and masking tape between the material and clamp to help dissipate the clamping pressure at both end of the sample. The straight region of the tensile bar was 34 mm between radii and this was the area judged during the stretching for elastic recovery. In all cases, the 2 psi test was done on a sample first for a time period of 3 hours in a high air flow oven at 95° C. after which time the samples were removed, cooled and measured. The weights and the bottom clamp were then removed and the samples were placed back in the high air flow oven at 95° C. vertically for 1 hour and then removed for cooling and measurement to determine an elastic recovery. Samples were then loaded for the 3.45 psi testing and placed in the oven for 17 hours (overnight); after which time the samples were removed, cooled and measured. The weights and bottom clamp were then removed and the samples were placed back in the high air flow oven at 95° C. vertically for 1 hour and then removed for cooling and measurement to determine an elastic recovery.

Moisture Analysis

The water content of raw materials was determined via a method of thermogravimetry using a Mark 4 Moisture Analyzer set at 150° C. This device measures the weight loss of the filler or other substances and does make the assumption that the only substance coming off is water and in this case should be a valid assumption being on the neat ingredient (D).

Depth of Cure

In the samples, if not enough internal moisture was present, then only cure from an exposed surface would occur. Using materials after 7 and 6 days of cure, a solvent resistance test was done with samples immersed in toluene for one day. Then the samples were removed and the toluene was allowed to evaporate to determine what was left. This type of test would be similar to that left behind in a typical swell gel test if weight measurements were done. However, an indication of sample cure could be seen from the thickness of the film left behind after the toluene was evaporated. In the case of very little material left behind, it suggests very little cured network and most likely just from the surface exposed. While samples that had enough moisture to cure the bulk of the material and be resistant to toluene were very thick and suggest a suitable moisture source was available to make a cured network.

Lap Shear Testing

The lap shear samples were prepared according to ASTM D3164-97 using 1"×3" glass panels and applying a heated sample in a heated area to create a 0.25 inch bondline. Samples were allowed to cure for a predetermined time, and then an Alliance RT/5 Tensiometer was used to pull the samples and obtain a lap shear value. Samples were applied and pressed between two glass panels in a 95° C. workspace, allowed to cool, and then tested. These values were all measured at room temperature or placed in a −31° C. freezer 30 minutes prior to testing and tested immediately after removal from the freezer.

Flexibility

The mandrel bend test, ASTM 3111 was done at −30° C. The mandrel and samples were placed in a freezer at −30° C. for 30 minutes. The size of each sample was 8 mm×22 mm and 3 mm thick. Upon removal of samples and rod, the samples were immediately bent over the rod and inspected for any cracking or change. Any signs of cracking or change were recorded.

Frost Point Testing

Using ASTM E546-88 Standard Test Method for Frost Point of Sealed Insulating Glass (IG) units as a guide a laboratory procedure was created for testing the Frost Point. The test was preformed on small laboratory unit (3"×6"). The unit was made with a sample that was mixed in a 1 to 1 ratio by volume using a MixPac S-50 hand held gun and static mixer maintained at 94° C. in a high air flow oven. The sample was dispensed in such a way to create an entire circle, oval or rectangular shape onto one glass panel and then a second glass panel was placed on top of the dispensed sample creating a sealed environment. The sample then desiccated the space between the glass panels. The unit was allowed to cure at room temperature for 4 days. After cure, the laboratory IG unit was subjected to dry ice directly on one side of the IG unit for 10 minutes. The dry ice was then removed and the outer surface was sprayed with isopropyl alcohol to dissipate the moisture condensing on the outer surface allowing the inner space of the window unit to be seen. If no condensation was visible, then the sample was considered to have a frost point below −78° C., the temperature of dry ice, solid $CO_2$.

Reference Example 2

In order to achieve the level of cure previously indicated within 3-4 weeks after the application of the composition, the composition needs to contain a sufficient amount of water that is liberated (available) at the given application temperature. Availability of water at the application temperature is preferably determined on the "wet" part of a two part composition rather than on the water release agent itself or the mixed composition. Measurement of water availability on the water release agent itself neglects any availability of water in the composition due to various other factors, such as solubility of water in the polymeric ingredients of the composition. Measurement of water availability in the mixed composition neglects to account for reaction of water with silanes, silicon-reactive polymer and other water scavenging ingredients, which may result in the conversion of water to reaction by-products, such as alcohols.

Water availability at application temperature in the wet part of the 2-part composition can be determined using a Karl-Fischer-Coulometer and an analytical scale with an accuracy of 0.1 mg by a modification of the method described in Annex C of EN 1279 Glass in Building—Insulating Glass Units, Part 2, Long-Term Test Method and Requirements for Moisture Penetration. Contrary to the standard test method, a temperature ramp-up is applied. Details on the test procedure are described below:

Procedure Parameters:

| Start Temperature: | 50° C. |
| End Temperature: | 250° C. |
| Temperature Gradient: | 2° C./min |
| Gas Flow: | 50 ml/min |

Procedure:

A 0.5 g sample is taken from the bulk (not the surface) of the wet part of the composition and immediately afterwards transferred into the vial of the Karl-Fischer-Coulometer. The vial is transferred into an Oven Sample Processor of the Karl-Fischer-Coulometer, and the measurement is started based on the procedural parameters set in the operating software of the coulometer. Separate measurements are carried out on triplicate samples. The Karl-Fischer method then determines the absolute amount of water that is liberated from the wet part of the composition. Based on the weight of the sample, this absolute amount can then be converted to weight % water released. Based on this reading, the amount of water in the mixed, curable composition can be determined based on the mixing ratio between the two components of the composition.

Good curability (as defined above) may be obtained when the amount of water released at the application temperature is above 0.015%, alternatively above 0.02%, and alternatively above 0.025%, each based on the weight of the total, mixed composition.

Examples 1 to 3

Comparison of Water Release Agents

Example 1 contains precipitated calcium carbonate as the only water release agent. Example 2 contains both precipitated calcium carbonate and hydrated molecular sieves. Example 3 contains no water release agent. Examples 1 to 3 were prepared as one-part compositions by mixing the ingredients in Table 2 in the order listed using a Universal Mixing Machine—Model AM 501 T from Hauschild, Waterkamp 1, Hamm 59075 Germany.

To prepare samples, first a pre-blend of was made by placing 25.2 grams of ingredient (J2) wax with 18 grams of ingredient (E1) carbon black in a Hauschild mixing cup, heating them at 97° C. for 30 minutes, and mixing for 26 seconds. The mixture was stirred by hand and mixed again. The mixture was removed and pressed between two sheets of release liner and cooled. This pre-blend was then added as a dry component in the masterbatch. Therefore, using 3.6 grams of pre-blend resulted in a 1.5 gram level of carbon black in the composition.

Ingredients (A1) silylated copolymer, (F2) polyisobutylene, the pre-blend prepared above, and (J2) wax were combined in a Hauschild mixing cup, heated at 97° C. in a high airflow oven for one hour, and then mixed for 26 seconds. Ingredient (G2) vinyltrimethoxysilane was then added to the cup and mixed with for another 26 seconds.

The following ingredients were then added in order: (D1) precipitated calcium carbonate, (E2) ground calcium carbonate, (I1) tetraethylorthosilicate, (I1) gamma-aminopropyltriethoxysilane, and (C1) molecular sieves. After each addition, the cup was placed in the high air flow oven at 97° C. for 10 to 15 minutes and the contents of the cup were mixed for 26 seconds.

At this stage the material was considered the masterbatch for later work. To conserve material and allow additional testing, a basis of 10 grams of masterbatch was used and formulated to final compositions. In a smaller mixing cup, the masterbatch was added and (D2) hydrated molecular sieves, if any, was mixed. This was followed by adding (B2) tin catalyst and mixing. The time at which the mixer was started after tin addition was considered the start of reactivity and was considered the start of curing.

TABLE 2

One part compositions.

| Ingredients | 1 Masterbatch, grams | 2 Masterbatch, grams | 3 Masterbatch, grams |
|---|---|---|---|
| (A1) silylated copolymer | 15 | 15 | 15 |
| (F2) polyisobutylene | 15 | 15 | 34 |
| Pre-Blend | 3.6 | 3.6 | 3.6 |
| (J2) wax | 7.9 | 7.9 | 7.9 |
| heat components above and mix on Hauschild mixer for 26 seconds | | | |
| (G2) VTM | 0.2 | 0.2 | 0.2 |
| mix on Hauschild mixer 26 seconds and same for every component after this | | | |
| (D1) precipitated CaCO₃ | 20 | 20 | |
| (E2) ground CaCO₃ | 19 | 19 | 19 |
| (I1) TEOS | 0.3 | 0.3 | 0.3 |
| (I2) A-1100 | 0.8 | 0.8 | 0.8 |
| (C1) 3A sieves | 15 | 15 | 15 |
| Masterbatch above | 9.68 | 9.68 | 9.68 |
| (D2) Doucil 4A | | 0.24 | 0.24 |
| (B2) DBTDL | 0.07 | 0.07 | 0.07 |

The physical property of durometer and solvent resistance were measured as described in reference example 1, and the results are in Table 3. Examples 1 and 2 show that in this one-part composition, the presence of (D2) hydrated molecular sieves does not significantly contribute to green strength, as shown by the initial durometer results. Table 3 suggests that water from the hydrated molecular sieves (example 2) does help this composition build 5 second durometer (bulk) and solvent resistance slightly, although without the water from the precipitated calcium carbonate (example 3), cure would not be sufficiently fast for the fast processing cycle the IG industry deems necessary. The cure via the Ares Rheometer also suggests internal cure water allows this formulation to achieve sufficiently fast cure.

TABLE 3

Results

| | Example # | | |
|---|---|---|---|
| | 1 | 2 | 3 |
| Days cured | 6 | 6 | 6 |
| Durometer, Shore A, initial | 57 | 56 | 37 |
| Durometer, Shore A, 5 second | 25 | 30 | 6 |
| Days Cured | 6 | 6 | 6 |
| Toluene solubility, liq. Clarity | | | |
| 15 min | | | 10 |
| 1 hr | 0 | 0 | 10 |
| 2 hr | 0 | 0 | 10 |
| 4 hr | 0 | 0 | 10 |
| overnight | 0 | 0 | 10 |
| 20 days | 1 | 0 | 10 |
| Ares Rheometer initial cure @ 95° C. | | | |
| G' crosses G", min | <4 | <4 | >130 |
| G', dyn/cm^2 @ 95° C. | 74720 | 60520 | ~6000 |

Examples 1 and 2 further show formation of an elastomeric network can be achieved at a rather low silylated copolymer content in this composition. This is surprising because an insufficiently crosslinked network, resulting in poor elastomeric properties, such as solvent resistance, swell/gel fraction, elastic recovery, did not occur.

Examples 4 to 7

Ability to Cure

Examples 4 to 7 were used to demonstrate the ability to cure. Compositions were made in a process similar to that described above for example 1 by mixing materials after heating at 97° C. via a Hauschild mixer. As few components as possible were used for differentiation of water source. Upon addition of the tin catalyst, the time for cure was started. Table 4 below shows that the composition with no water added by some means, example 4, did not cure in at least the one hour allowed for the testing. The precipitated calcium carbonate sample, example 5, shows the fastest gel point at 4.5 minutes which was half of the high content hydrated molecular sieve formulation, example 7.

TABLE 4

One Part Compositions

| | Example | | | |
|---|---|---|---|---|
| | 4 | 5 | 6 | 7 |
| (A1) silylated copolymer | 20 | 20 | 20 | 20 |
| (F1) polyisobutylene | 2 | 2 | 2 | 2 |
| (D1) precipitated CaCO₃ | 0 | 0 | 20 | 0 |

TABLE 4-continued

One Part Compositions

| | Example | | | |
|---|---|---|---|---|
| | 4 | 5 | 6 | 7 |
| (D2) hydrated molecular sieves | 0 | 2.4 | 0 | 9.6 |
| (B2) DBTDL | 0.7 | 0.7 | 0.7 | 0.7 |
| Data on material | | | | |
| % filler | 0 | 9.6 | 46.8 | 29.7 |
| % water | 0 | 1.41 | 0.28 | 4.37 |
| Ares Rheometer | | | | |
| G' crosses G", min | no cure | 11.7 | 4.5 | 8.5 |
| G', dyn/cm^2 @ cross | 313 | 7185 | 237300 | 13200 |

The water contents of the hydrated molecular sieves and precipitated calcium carbonate were determined via a method of thermogravimetry using a Mark 4 Moisture Analyzer set at 150° C. on the raw material and not the actual composition. This device measures the weight loss and makes the assumption that the only substance coming off is water, which in this case should be a valid assumption being on the raw material.

These experiments show that, at an application temperature of 100° C., precipitated $CaCO_3$ is a substantially more effective source of water than hydrated molecular sieves in this composition. The storage modulus (G') is related to elastomeric properties of the cured product of the composition. The loss modulus (G") is related to viscous flow properties of the cured product. Achieving a cross-over of G' crosses G" moduli within a short period of time can be interpreted as the composition starting to cure more quickly. Example 5 shows that cure begins more quickly with precipitated $CaCO_3$ in this composition than with hydrated molecular sieves in examples 6 and 7, even though the % of water in the composition is higher in examples 6 and 7 than in example 5. Example 5 had the highest G' value, corresponding to faster cure (more cure occurs to form more cured network at this time in example 5 than in the comparative examples). Without wishing to be bound by theory, it is thought that the composition of this invention offers the advantage of having improved cure with reduced water content as compared to compositions that contain larger amounts of water carried on hydrated molecular sieves, and this may improve storage stability of the composition and may reduce the risk of moisture diffusing into the interpane space of an IG unit. Based on the results of examples 1-7, precipitated $CaCO_3$ may be used as water source for an application temperature range ranging from 90° C. to 110° C., rather than molecular sieves. However, without wishing to be bound by theory it is thought that saturated molecular sieve may be used for ingredient (D) at a higher application temperature range, e.g., 120° C. to 140° C. Furthermore, without wishing to be bound by theory it is thought that the composition of this invention may offer the advantage of eliminating the need for a hydrated salt as a water source, thereby avoiding the disadvantages associated therewith, such as negative effect on adhesion.

To further investigate the cure by moisture content, examples 4 to 7 were tested for solvent resistance according to reference example 1. Samples were tested after 7 and 6 days of cure. Although it was difficult see if a sample was dissolving since no carbon black was present to effectively color the sample, in each case the samples looked still intact although different. After in toluene for a day, the sample was removed and the toluene was allowed to evaporate to determine what was left behind, which is typical of the swell gel test. Weight measurements were not done so percent gel or unreacted material was not available. However an indication of sample cure can be seen from the thickness of the film left behind after the toluene evaporated. In comparative example 2, very little material was left behind at 0.07 mm membrane thicknesses suggesting very little cured network had formed and most likely cure had just occurred from the surface exposed. Comparative examples 3 and 4 and example 3 all had enough moisture to cure the bulk of the material and be resistant to toluene suggesting each to be a suitable moisture source given sufficient cure time. The results are in Table 5.

TABLE 5

Solvent Resistance

| | Example | | | |
|---|---|---|---|---|
| | 4 | 6 | 5 | 7 |
| Toluene solubility, liq. Clarity | | | | |
| time cured (days) | 7 | 7 | 6 | 6 |
| 15 min 1 flip | 0 | 0 | 0 | 0 |
| 2 hour | 0 | 0 | 0 | 0 |
| 4 hour | 0 | 0 | 0 | 0 |
| Overnight | 0 | 0 | 0 | 0 |
| thickness of dried film, mm | 0.07 | 2.6 | 2.3 | 2.9 |

Examples 8 to 10

Ability to Formulate Product in a Two-Part System with Mix Ratio of 1:1 by Volume and 2:1 by Weight Examples 8-10 show that the composition may be prepared as a two-part composition with a mix ratio of 1:1 or close to 1:1 (such as 1:2 or 2:1). Without wishing to be bound by theory, it is thought that this is beneficial because these mix ratios are more forgiving in terms of mix ratio tolerances than RTV two-part products, which typically have mix ratios of 10:1 base to catalyst.

Example 8 (mixed), 9 (mixed), and 10 (mixed) gave good product when mixed in a 1:1 by volume or 2:1 by weight mix ratio. In the 1:1 by volume examples no formulation data is presented due to unknown data, but the individual parts can be done on a weight basis and said to be mixed on a one to one by volume basis considering the specific gravity of the two parts.

TABLE

6 Two Part Compositions

| Ingredients | 8 (mixed) 2:1 mix by weight | 8 (mixed) 1:1 mix by volume | 9 (mixed) 2:1 mix by weight | 9 (mixed) 1:1 mix by volume | 10 (mixed) 2:1 mix by weight | 10 (mixed) 1:1 mix by volume |
|---|---|---|---|---|---|---|
| (A1) silylated copolymer | 25 | | 20 | | 15 | |
| (F3) polyisobutylene | 32.4 | | 37.4 | | 42.4 | |
| (J2) wax | 10 | | 10 | | 10 | |
| (E1) carbon black | 1.3 | | 1.3 | | 1.3 | |
| (G2) VTM | 0.067 | | 0.067 | | 0.067 | |
| (D1) precipitated CaCO$_3$ | 14.67 | | 14.67 | | 14.67 | |
| (I2) adhesion promoter | 0.33 | | 0.33 | | 0.33 | |
| (C1) 3A molecular sieves | 15 | | 15 | | 15 | |
| (K1) Tinuvin 292 | 0.25 | | 0.25 | | 0.25 | |
| (K2) Tinuvin 571 | 0.25 | | 0.25 | | 0.25 | |
| (B1) tin, Metatin 740 | | | | | | |
| (B2) tin, DBTDL | 0.7 | | 0.7 | | 0.7 | |
| Days cured | 4 | 7 | 4 | 7 | 4 | 7 |
| Durometer, Shore A, initial | 32 | 48 | 38 | 46 | 32 | 45 |
| Durometer, Shore A, 5 second | 4 | 21 | 7 | 15 | 5 | 13 |
| Days cured | 6 | 56 | 6 | 56 | 6 | 56 |
| Durometer, Shore A, initial | 32 | 55 | 42 | 56 | 32 | 53 |
| Durometer, Shore A, 5 second | 4 | 24 | 8 | 22 | 5 | 18 |
| Days Cured | 6 | | 6 | 1 | 6 | |
| Toluene solubility, liq. Clarity | | | | | | |
| 15 min | | | | 2 | | |
| 1 hr | 5 | | 6 | 5 | 6 | |
| 2 hr | 8 | | 8 | 8 | 8 | |
| 4 hr | 10 | | 10 | | 10 | |
| Overnight | 10 | | 10 | 10 | 10 | |
| Days Cured | 41 | 56 | 40 | 56 | 40 | 56 |
| Toluene solubility, liq. Clarity | | | | | | |
| 15 min | 0 | 0 | 0 | 0 | 0 | 0 |
| 1 hr | | 0 | | 0 | | 0 |
| 2 hr | 0 | | 0 | | 0 | |
| 4 hr | 0 | | 0 | | 0 | |
| Overnight | 0 | | 0 | | 0 | |

Examples 8, 9, and 10 mixed on a 1 to 1 volume basis were also tested for flexibility. The mandrel bend test, ASTM 3111 was done at −30° C. The mandrel and specimens of each example were placed in a freezer at −30° C. for 30 minutes. The size of each specimen was 8×22 mm and 3 mm thick. Upon removal of samples and rod the samples were immediately bent over the rod and inspected for any cracking or change. All samples were easily bent and showed no signs of cracking.

Examples 11 and 12

Commercially Available "Curable" and "Structural" PIB/Butyl Materials

Toluene solubility testing of example 1, Delchem D-2000 (advertised as a reactive Hot Melt Butyl IG Sealant example 12, Delchem D130 HM Butyl (advertised as a Hot Melt Butyl IG Sealant with improved structural properties for the Intercept® spacer system), both commercially available from Delchem, Inc., P.O. Box 10703, Wilmington, Del. 19850, U.S.A, and example 13 Ködimelt TPS a (non-curable) TPS material from Kömmerling, Pirmasens, Germany, show these materials do not crosslink well even after being dispensed and allowed to cure for 3 years. The toluene solubility data for the Delchem D-2000 based on the numbers reported in Table 7 appears to be low, even when stored overnight, however the material was falling apart and breaking up. In previous swell gel testing much of the Delchem D-2000 was dissolved and the HM Butyl dissolved completely, which is representative of a non-crosslinked system. Similarly as Kommerling Ködimelt is non-curable, the material dissolves in toluene even after 3 years storage.

TABLE 7

Commercially Available TPS Materials

| | 11 Delchem D-2000 | 12 Delchem D-130 HM Butyl. | 13 Kömmerling Kodimelt |
|---|---|---|---|
| Days Cured | 3 years | 3 years | |
| Toluene solubility, liq. Clarity | | | |
| 15 min | 0 | 1 | |
| 1 hr | 0 | 2 | |
| 2 hr | 0.5 | 3 | |
| 4 hr | 0.5 | 3 | |
| Overnight | 2* | 8 | 10 |

*color difference was not evidenced and absence of discoloration of solvent was believed to be due to lack of carbon black filler in the formulation.

Examples 14 to 17

Development of Green Strength

Rapid development of green strength is desirable because it may allow handling of sealed IG units at the end of a production line and early shipping of the units (units can be made to order and shipped rapidly). Without wishing to be bound by theory, it is thought that microcrystalline wax provides excellent green strength to the sealant, i.e., a strong increase in composition viscosity with a temperature drop.

Example 15 is meant to demonstrate the development of green strength, or strength before cure, of a material without the effects of onset of cure confounding green strength. Example 15, therefore, is an otherwise curable formulation however without addition of a tin catalyst so as to delay the onset of cure. The lap shear strength was measured according to ASTM D816-82 (1993)e1, D1002-94 using glass panels and applying heated material in a heated area. The sample produced a lap shear value of 20.4 psi. Example 16 was made without tin catalyst and gave a lap shear value of 22.7 psi. Example 14 was the same as example 16 except tin catalyst was added. Example 14 produced a lap shear value of 36.7 psi after 7 days of cure. In comparison, example 17 of Ködimelt TPS from Kömmerling gave a lap shear value of 13.7 psi. Therefore, the green strength from composition of example 13 is sufficient for manufacture of IG units. These values were all measured at room temperature.

added to this blend. The lap shear specimen was prepare by normal means according to ASTM D816-82 (1993)e1, D1002-94 on 2 pieces of glass 1 inch by 3 inches where the bondline of adhesive was 0.25 inches thick. The material was mixed and applied to the glass through a two part 50 cc mixing system that used a seventeen element static mixer while being heated in a 94° C. oven.

TABLE 9

Two Part Composition

| Ingredients | Example 18A parts | Example 18B parts |
|---|---|---|
| (A1) silylated polyisobutylene | 42.8 | |
| (F3) polyisobutylene | | 19.6 |
| (J2) wax | 10 | 10 |
| (E1) carbon black | 1 | |
| (D1) precipitated $CaCO_3$ | 22 | 18 |
| (E2) ground $CaCO_3$ | 19 | 19 |
| (I4) adhesion promoter | | 1 |
| (G3) phenyltrimethoxysilane | | 1 |
| (C1) molecular sieves | | 30 |
| (D2) hydrated molecular sieves | 4.8 | |
| (K1) Tinuvin 292 | 0.2 | |
| (K2) Tinuvin 571 | 0.2 | |
| (B2) tin catalyst, DBTDL | | 1.4 |

TABLE 8

| Formulation components | Example 15 parts | Example 14 parts | Example 16 parts | Example 17 TPS from Kömmerling |
|---|---|---|---|---|
| (A1) silylated copolymer | 10 | 15 | 15 | |
| (F1) polyisobutylene | 10 | | | |
| (F2) polyisobutylene | 10 | 15 | 15 | |
| (J1) wax | 10 | | | |
| (J2) wax | | 10 | 10 | |
| (E1) carbon black | 2 | 2.0 | 2.0 | |
| (G1) VTES | 0.2 | | | |
| (G2) VTM | | 0.2 | 0.2 | |
| (D1) precipitated $CaCO_3$ | 20 | 20 | 20 | |
| (E2) ground $CaCO_3$ | 19 | 19 | 19 | |
| (I1) TEOS | 0 | 0.3 | 0.3 | |
| (I2) aminopropyltriethoxysilane | 1 | 0.8 | 0.8 | |
| (C1) 3A sieves (dry) | | 15 | 15 | |
| (C2) 4A dried sieves (dry) | 15 | | | |
| (D3) 4A sieves (wet) | 1.5 | | | |
| (D2) 4A sieves (wet) | | 2.4 | | |
| (B2) tin catalyst, DBTDL | | 0.7 | | |
| Lap Shear | | | | |
| days cured | no cure*) | 7 | no cure*) | no cure*) |
| peak stress, psi | 20.4 | 36.7 | 22.7 | 13.7 |
| % strain at peak | 2.67 | 2.8 | 2.1 | 12.2 |
| failure form | 100% cohesive | 10% cohesive-voids | N/A | N/A |

*)Tested immediately after cool-down to ambient laboratory temperature (ca. 23° C.)

Example 18

Cold Flexibility Despite Presence of Wax

Example 18 Parts A and B mixed by volume on a 1 to 1 basis showed a lap shear value of 78.4 psi and a strain of 4.6% even at −31° C. after 7 days of cure. The sample was made up in the individual parts similar to the method for Examples 8-10 previously explained again using a masterbatch of carbon black, but in the case here, the antioxidants were also

Example 19

Two-Part Formulation Prepared on Continuous Compounder

The two-part composition shown in Table 10 was compounded on a COPERION 25 mm co-rotating, fully intermeshing twin screw extruder, 12 barrels long (48:1 Length: Diameter, L:D ratio).

TABLE 10

Two-Part Composition

| | Example | |
|---|---|---|
| Ingredients | 19A parts | 19B parts |
| (A1) silylated polyisobutylene | | 38.0 |
| (F4) polyisobutylene | 38.0 | |
| (J2) wax | 1.0 | 1.0 |
| (L1) tackifier | 9.0 | 2.0 |
| (E1) carbon black | 30.0 | |
| (D1) precipitated CaCO$_3$ | 22.0 | |
| (I4) adhesion promoter | | 1.0 |
| (G2) Vinyltrimethoxysilane | | 0.2 |
| (G3) phenyltrimethoxysilane | | 1.0 |
| (C1) molecular sieves | | 54.0 |
| (K1) Tinuvin 292 | | 0.4 |
| (K2) Tinuvin 571 | | 0.4 |
| (B2) tin catalyst, DBTDL | | 2.0 |

An intermediate of Part A was prepared by feeding ingredient (F4) in the first barrel of the extruder via a Bonnot pump and gear pump for metering. Ingredients (J2) and (L1) were added in the third barrel. A pre-blend of ingredient (D1) and ingredient (E1) was prepared by shaking these ingredients in a plastic bag, and 60% of this filler pre-blend (by weight) was added in the ninth barrel of the extruder. Vacuum was pulled in the eleventh barrel. The resulting mixture was extruded at the end of the twelfth barrel as an intermediate. After completion of the intermediate manufacture, this intermediate was again fed into the first barrel via a Bonnot pump and gear pump for metering. The remaining 40% of the filler pre-blend was added in the ninth barrel of the extruder. Vacuum was pulled in the eleventh barrel. The resulting mixture was extruded at the end of the twelfth barrel as Part A of the composition.

Part B was prepared by feeding ingredient (A1) via a Bonnot pump and gear pump for metering in barrel 1. Ingredients (J2) and (L1) were added in barrel 3. Ingredients (I4), (G2), (G3), (K1), (K2), and (B2) were pre-blended in glassware by shaking manually and then added in barrel 5 via high pressure high pressure dual piston (HPLC) pump. Vacuum was pulled at barrel 7 to strip off methanol. Ingredient (C1) was added in barrel 9. Vacuum was pulled in barrel 11. The resulting mixture was extruded at the end of barrel 12.

The extruder ran at 200 to 600 rpm for Part A and 100 to 400 rpm for Part B (machine capability is 0-1200 rpm). When making Part A, the temperature profile ranged from 90° C. to 120° C. along the length of the machine (half the length was at 90° C. and the rest was at 120° C.). When making part B, the temperature profile was typically 90° C. for the whole length of the machine.

Parts A and B were packaged into 500 mL 'sausage' containers. Parts A and B were mixed together by a two-part mixing and dosing machine. The sausage containers were fed into two cylinders pressurized to ca. 280 10$^5$ Pa by hydraulics for feeding the two parts into a heated static mixer (length 80 cm, minimum 15 static mixing elements) and from there into a gear pump and then into a Bystronic TPS application head (with a 5.8 mm×18 mm extrusion die). The equipment was set to 90° C. application temperature. Further experimental conditions for the application equipment are in Table 11.

TABLE 11

Experimental Conditions Application Trial

| Application Equipment Process Parameters | | Units |
|---|---|---|
| Temperature | 90 | ° C. |
| Hydraulics pressure | 285 | 10$^5$ Pa |
| Material pressure prior to static mixer | 125 | 10$^5$ Pa |
| Material pressure post static mixer | 30 | 10$^5$ Pa |
| Die (nozzle) | 5.8 | Mm |
| Extrusion width | 18.2 | Mm |
| Conveyor speed (estimate) | 0.2 | m/min |
| Extrusion rate | 0.02184 | l/min |
| Appearance of extrusion bead | Good | |
| Wet-out | Good | |
| Slump of bead | Slight slump (ca. 9°) | Measured after 1 hour |

Excellent mixing of the two parts was achieved (judged visually by cutting about ⅓ through the bulk mixed material and then extending the cut by pulling the strands apart) with >15 static mixing elements. At 90° C., the composition prepared by mixing the two parts extruded well (except for the low extrusion rate (ca. 100 g/min) achieved on the application equipment). The composition had good wet-out on glass (judged by visually inspecting the glass/sealant interface through the glass) and good tack on glass when applied hot at 90° C. When applied at lower temperatures (30° C. to 40° C.) to a cold glass surface, the composition still exhibited acceptable tack. The composition also had good self-adhesion (newly applied hot material adhering to previously applied cold material).

A 2 mm thick sheet of the composition was cured at 90° C. and 30 10$^5$ Pa pressure for 40 minutes. Afterwards the resulting cured product showed a near 100% elastic recovery when bent by 90° around a mandrel within 1 minute. The cured product did not dissolve when stored in toluene at room temperature for 1 week with daily repetitive vigorous shaking.

Example 19

Two-Part Formulation Prepared on Continuous Compounder

The two-part composition shown in Table 12 is compounded on a COPERION 25 mm co-rotating, fully intermeshing twin screw extruder, 12 barrels long (48:1 Length:Diameter, L:D ratio).

TABLE 12

Two-Part Composition

| | Example | |
|---|---|---|
| Ingredients | 19A parts | 19B parts |
| (A1) silylated polyisobutylene | | 38.0 |
| (F4) polyisobutylene | 38.0 | |
| (J2) wax | 1.0 | 1.0 |
| (L1) tackifier | 9.0 | 2.0 |
| (E1) carbon black | 30.0 | |
| (D1) precipitated CaCO$_3$ | 22.0 | |
| (I4) adhesion promoter | | 1.0 |
| (G2) Vinyltrimethoxysilane | | 0.2 |
| (G3) phenyltrimethoxysilane | | 1.0 |
| (C1) molecular sieves | | 54.0 |
| (K1) Tinuvin 292 | | 0.4 |

TABLE 12-continued

| | Two-Part Composition | |
|---|---|---|
| | Example | |
| Ingredients | 19A parts | 19B parts |
| (K2) Tinuvin 571 | | 0.4 |
| (B2) tin catalyst, DBTDL | | 2.0 |

Part A is prepared by feeding ingredient (F4) in the first barrel of the extruder via a Bonnot pump and gear pump for metering Ingredients (J2) and (L1) are added in the third barrel. A pre-blend of 22 parts ingredient (D1) and 15 parts ingredient (E1) is prepared by shaking these ingredients in a plastic bag. The pre-blend is added in the ninth barrel of the extruder. The remaining 15 parts of ingredient (E1) str added in the sixth barrel. Vacuums pulled in the eleventh barrel. The resulting mixture is extruded at the end of the twelfth barrel.

Part B is prepared by feeding ingredient (A1) via a Bonnot pump and gear pump for metering in barrel 1. Ingredients (J2) and (L1) are added in barrel 3. Ingredients (I4), (G2), (G3), (K1), (K2), and (B2) are pre-blended in glassware by shaking manually and then added in barrel 5 via high pressure HPLC pump. Vacuum is pulled at barrel 7 to strip off methanol. Ingredient (C1) is added in barrel 9. Vacuum is pulled in barrel 11. The resulting mixture is extruded at the end of barrel 12.

The extruder is run at 200 to 600 rpm for Part A and 100 to 400 rpm for Part B (machine capability is 0-1200 rpm). When making Part A, the temperature profile ranges from 90° C. to 120° C. along the length of the machine (half the length is at 90° C. and the rest is at 120° C.). When making part B, the temperature profile is typically 90° C. for the whole length of the machine.

Parts A and B are packaged into 500 mL 'sausage' containers. Parts A and B are mixed together by a two-part mixing and dosing machine. The sausage containers are fed into two cylinders pressurized to ca. 280 $10^5$ Pa by hydraulics for feeding the two parts into a heated static mixer (length 80 cm, minimum 15 static mixing elements) and from there into a a gear pump and then into a Bystronic TPS application head (with a 5.8 mm×18 mm extrusion die). The equipment is set to 90° C. application temperature. Further experimental conditions for the application equipment are in Table 13.

TABLE 13

| Experimental Conditions Application Trial | | |
|---|---|---|
| Application Equipment Process Parameters | | Units |
| Temperature | 90 | ° C. |
| Hydraulics pressure | 285 | $10^5$ Pa |
| Material pressure prior to static mixer | 125 | $10^5$ Pa |
| Material pressure post static mixer | 30 | $10^5$ Pa |
| Die (nozzle) | 5.8 | Mm |
| Extrusion width | 18.2 | Mm |
| Conveyor speed (estimate) | 0.2 | m/min |
| Extrusion rate | 0.02184 | l/min |
| Appearance of extrusion bead | Good | |
| Wet-out | Good | |
| Slump of bead | Slight slump (ca. 9°) | Measured after 1 hour |

Example 20

Two-Part Formulation Prepared on Continuous Compounder

The two-part composition shown in Table 14 was compounded on a COPERION 25 mm co-rotating, fully intermeshing twin screw extruder, 12 barrels long (48:1 Length: Diameter, L:D ratio).

TABLE 14

| | Two-Part Composition | |
|---|---|---|
| | Example | |
| Ingredients | 20A parts | 20B parts |
| (A1) silylated polyisobutylene | | 47.8 |
| (F3) polyisobutylene | 42.35 | |
| (J2) wax | 1.0 | 1.0 |
| (F5) polyolefin plastomer | 5.0 | 7.5 |
| (F6) SEPS block copolymer | | 12.5 |
| (E3) untreated fumed silica | 10.0 | 10.0 |
| (E1) carbon black | 0.05 | |
| (D1) precipitated $CaCO_3$ | | 20 |
| (I4) aminoethylaminopropyltrimethoxysilane adhesion promoter | 0.8 | |
| (G3) phenyltrimethoxysilane | | 0.4 |
| (C3) molecular sieve (zeolite) 3A (dry) | 40 | |
| (K1) Tinuvin 292 | | 0.4 |
| (K2) Tinuvin 571 | | 0.4 |
| (B2) DBTDL tin catalyst | 0.8 | |

Part A was prepared by pre-blending ingredients (J2) and (F5) and metering them into the first barrel with a gravimetric single screw feeder (K-Tron). The materials are mixed and masticated in the first two barrels prior to pumping and metering 30-50% of ingredient (F3) into the third barrel using a Bonnot pump in conjunction with a gear pump. These materials are thoroughly mixed prior to the injection of ingredients (I4) and (B2) in the fourth barrel using HPLC pumps, a static mixer, and a high pressure injection valve. Again, these materials are thoroughly mixed prior to adding ingredients (C3) and (E1) which are pre-blended and fed into the side of barrel 6 using a twin screw feeder (Brabender) along with a twin screw side stuffer (Coperion). The materials are incorporated into the blend and the balance of the remaining 50-70% of ingredient (F3) is added in barrel 7 using a Bonnot pump in conjunction with a gear pump. The fillers are well dispersed prior to adding ingredient (F6) in the side of barrel 9 again using a twin screw feeder (K-Tron) in conjunction with a twin screw side stuffer (Coperion). The second filler is well dispersed and vacuum is applied on barrel 11 to remove residual by-products and air. The resulting mixture is extruded at the end of the twelfth barrel.

Part B was prepared by pre-blending ingredients (J2), (F5), and (F6) and metering them into the first barrel with a gravimetric single screw feeder (K-Tron). The materials are mixed and masticated in the first two barrels prior to pumping and metering 30-50% of ingredient (A1) into the third barrel using a Bonnot pump in conjunction with a gear pump. These materials are thoroughly mixed prior to the injection of ingredients (G3), (K1), and (K2) in the fourth barrel using HPLC pumps, a static mixer, and a high pressure injection valve. Again, these materials are thoroughly mixed prior to adding ingredient (D1) which was fed into the side of barrel 6 using a twin screw feeder (Brabender) along with a twin screw side stuffer (Coperion). The materials are incorporated into the blend and the balance of the remaining 50-70% of ingredient (A1) is added in barrel 7 using a Bonnot pump in conjunction with a gear pump. The fillers are well dispersed prior to adding ingredient (E3) in the side of barrel 9 again using a twin screw feeder (K-Tron) in conjunction with a twin screw side stuffer (Coperion). The second filler is well dispersed and vacuum is applied on barrel 11 to remove residual by-products and air. The resulting mixture is extruded at the end of the twelfth barrel.

The extruder ran at 200 to 600 rpm for Part A and 100 to 400 rpm for Part B (machine capability is 0-1200 rpm). When making part A, the temperature profile was typically 90° C. for the whole length of the machine. When making Part B, the temperature profile ranged from 120° C. to 90° C. along the length of the machine (first three barrels were at 120° C. and the rest of the machine was at 90° C.).

Parts A and B were packaged into 200 L drums using a lance type filling system. Parts A and B were mixed together by a two-part mixing and dosing machine. Materials (Part A and B) from the drums were fed into the pressure cylinders (described in Examples 18 and 19) via hydrolytically operated hot melt drum pumps using heated follower-plate. The two cylinders were then pressurized to ca. 280 $10^5$ Pa by hydraulics for feeding the two parts into a heated static mixer (length 80 cm, minimum 15 static mixing elements) and from there into a gear pump and then into a Bystronic TPS application head (with a 5.8 mm×18 mm extrusion die). The equipment was set to 95° C. application temperature. Further experimental conditions for the application equipment are in Tables 15 and 16.

TABLE 15

Experimental Conditions Application Trial

| Application Equipment Process Parameters | | Units |
|---|---|---|
| Temperature | 95 | ° C. |
| Material pressure prior to static mixer | Variable | $10^5$ Pa |
| Material pressure post static mixer | Variable | $10^5$ Pa |
| Die (nozzle) | 5.8 | Mm |
| Extrusion width | 18.2 | Mm |
| Extrusion rate | Variable | l/min |
| Appearance of extrusion bead | Good | |
| Wet-out | Good | |
| Slump of bead | Slight slump (ca. 9°) | Measured after 1 hour |

TABLE 16

Experimental Conditions Application Trial

| Gear pump speed rpm (l/min) | Torque gear pump (Nm) | pressure before gear pump ($10^5$ Pa) | pressure after gear pump ($10^5$ Pa) | Extrusion rate (grams/minute) |
|---|---|---|---|---|
| 10 | 5.1 | ~43 | ~47 | 294 |
| 20 | 6.9 | 37-39 | 78-65 | 574.8 |
| 30 | 7.8 | 36-34 | 92-75 | 838.5 |
| 40 | 8.7 | 34-32 | 107-82 | 1122 |
| 50 | 9.2 | 29-28 | 119-90 | 1402.4 |
| 60 | 9.2 | 29-27 | 128-92 | 1636 |

Excellent mixing of the two parts was achieved (judged visually by cutting about ⅓ through the bulk mixed material and then extending the cut by pulling the strands apart) with >15 static mixing elements. At 95° C., the composition prepared by mixing the two parts extruded well (at a gear pump rotation speed of 60 rpm, a maximum extrusion rate of about 1600 grams/minute was achieved. The composition had good wet-out on glass (judged by visually inspecting the glass/sealant interface through the glass) and good tack on glass when applied hot at 95° C. When applied at lower temperatures (30° C. to 40° C.) to a cold glass surface, the composition still exhibited very good tack. The composition also had good self-adhesion (newly applied hot material adhering to previously applied cold material). Up to an extrusion width of 12 mm, the bead exhibited no slump at all.

A 2 mm thick sheet of the composition was cured at 100° C. and 30 $10^5$ Pa pressure for 40 minutes. Afterwards the resulting cured product showed a near 100% elastic recovery when bent by 90° around a mandrel within 1 minute. The cured product did not dissolve when stored in toluene at room temperature for 1 week with daily repetitive vigorous shaking.

A first insulating glass (IG) unit was prepared in order to evaluate the load bearing capability of the freshly applied bead. The IG unit was assembled as follows: First a 12 mm wide and 5.8 mm thick bead of the mixed material was applied along the perimeter of a 4 mm thick float glass pane with 50×50 $cm^2$ dimensions. Immediately afterwards, the glass pane together with the applied bead was pressed against a 4 mm thick float glass pane with 100×100 $cm^2$ dimensions in such a manner that the smaller pane was centered exactly in the middle of the larger pane. The smaller pane was then set on wooden setting blocks in such a way that the larger pane was complete unsupported and the bead of the mixed material had to carry the weight of the unsupported pane. After 1 hour, a maximum sagging of 2.5 mm of the larger pane was observed. In comparison, a freshly applied TPS/silicone dual seal tested under the same conditions will results in a maximum sagging of 3-4 mm of the unsupported glass pane.

A second insulating glass (IG) unit was prepared in order to evaluate the initial adhesion (tack) of the freshly applied bead. The IG unit was assembled as follows: First a 12 mm wide and 5.8 mm thick bead of the mixed material was applied along the perimeter of a 4 mm thick float glass pane with 35×55 $cm^2$ dimensions. Immediately afterwards, the glass pane together with the applied bead was pressed against a 4 mm thick float glass pane with 35×55 $cm^2$ dimensions. After allowing the material to cool down for 1 hour, the initial adhesion (tack) of the material was tested by performing the butterfly test on the IG unit as described in European Standard EN 1279 Part 6 (2002) in Annex F.4.2 Butterfly Test. The butterfly test was performed by rotating the two cut pieces of float glass by 180° without any loss of adhesion of the sealant material being observed.

The stability of the material components (Parts A and B) was tested by keeping the drums heated at 95° C. for 16 hours. Afterwards the extrusion rate was tested as described before in this Example. No changes in extrusion rate were observed.

The invention claimed is:

1. A composition comprising:
   (A) 10 to 65 weight % of a moisture-curable, silane-functional, elastomeric, organic polymer;
   (B) 0.1 to 3 weight % of a condensation catalyst;
   (C) 15 to 25 weight % of a physical drying agent;
   (D) 5 to 30 weight % a water release agent that releases water over an application temperature range;
   (E) 0 to 30 weight % of a filler;
   (F) 0 to 30 weight % of a non-reactive, elastomeric, organic polymer;
   (G) 0 to 5 weight % of a crosslinker;
   (H) 0 to 5 weight % of a chemical drying agent other than ingredient (G);

(I) 0 to 5 weight % of an adhesion promoter other than ingredients (G) and (H);

(J) 0 to 20 weight % of a microcrystalline wax, which is a solid at 25° C.;

(K) 0 to 3 weight % of an anti-aging additive; and (L) 0 to 20 weight % of a tackifying agent.

2. The composition of claim 1 where the composition is prepared as a multiple part composition comprising (I) a wet part and (II) a dry part, and (I) the wet part comprises
  optionally (F) the non-reactive, elastomeric, organic polymer,
  (D) the water release agent,
  optionally (J) wax,
  optionally (L) tackifying agent, and
  optionally (E) reinforcing and extending fillers;
  optionally (K) the anti-aging additive, and (II) the dry part comprises
  (A) the moisture-curable, silane-functional, elastomeric, organic polymer,
  optionally (F) the non-reactive, elastomeric, polymer,
  (B) the condensation catalyst,
  (C) the physical drying agent,
  optionally (J) the wax,
  optionally (L) the tackifying agent,
  optionally (G) the crosslinker,
  optionally (H) the chemical drying agent,
  optionally (K) the anti-aging additive, and
  optionally (I) the adhesion promoter.

3. The composition of claim 1 where the composition is prepared as a multiple part composition comprising (I) a wet part and (II) a dry part, and (I) the wet part comprises
  (A) The moisture-curable, silane-functional, elastomeric, organic polymer
  optionally (F) the non-reactive, elastomeric, organic polymer,
  (D) the water release agent, optionally (J) wax,
  optionally (L) tackifying agent, and
  optionally (E) reinforcing and extending fillers;
  optionally (K) the anti-aging additive, and (II) the dry part comprises
  Optionally (F) the non-reactive, elastomeric, organic polymer,
  (B) the condensation catalyst,
  (C) the physical drying agent,
  optionally (J) the wax,
  optionally (L) the tackifying agent,
  optionally (G) the crosslinker,
  optionally (H) the chemical drying agent,
  optionally (K) the anti-aging additive, and
  optionally (I) the adhesion promoter.

4. A process for making the composition of claim 2 comprising: 1) mixing under shear ingredients comprising (A), (B), and (C) to form the dry part, and 2) mixing under shear ingredients comprising (F) and (D) to form the wet part.

5. A process for making the composition of claim 2 comprising:
1) mixing under shear ingredients comprising (A), (F), (B), and (C) to form the dry part, and
2) mixing under shear ingredients comprising (F) and (D) to form the wet part.

6. A process for making the composition of claim 2 comprising:
1) mixing under shear ingredients comprising (A), (B), and (C) to form the dry part, and 2) mixing under shear ingredients comprising (J) and (D) to form the wet part.

7. A process for making the composition of claim 3 comprising:
1) mixing ingredients comprising (B), and (C) to form the dry part, and
2) mixing under shear ingredients comprising (A) and (D) to form the wet part.

8. A process for curing the composition of claim 1, where curing the composition is performed by heating the composition at a temperature ranging from 80° C. to 110° C. during applying the composition to a substrate, after applying the composition to a substrate, or a combination thereof.

9. The composition of claim 1, where ingredient (A) is selected from the group consisting of a silylated copolymer of an iso-mono-olefin and a vinyl aromatic monomer, a silylated homopolymer of the iso-mono-olefin, a silylated homopolymer of the vinyl aromatic monomer, and a combination thereof.

10. The composition of claim 1, where ingredient (A) is selected from the group consisting of a silylated copolymer of isobutylene and an alkylstyrene, a silylated homopolymer of the isobutylene, a silylated copolymer of isoprene and isobutylene, a silylated homopolymer of the alkylstyrene, and a combination thereof.

11. The composition of claim 1, where ingredient (B) is a tin (IV) compound.

12. The composition of claim 1, where ingredient (C) is selected from the group consisting of zeolites, molecular sieves, and a combination thereof.

13. The composition of claim 1, where ingredient (D) is precipitated calcium carbonate.

14. The composition of claim 1, where ingredient (E) is present, and ingredient (E) is selected from the group consisting of a reinforcing filler, an extending filler, a thixotropic filler, a pigment, and a combination thereof.

15. The composition of claim 1, where ingredient (F) is present, and ingredient (F) is polyisobutylene.

16. The composition of claim 1, where ingredient (G) is present, and ingredient (G) comprises an alkoxysilane, an oligomeric reaction product of the alkoxysilane, or a combination thereof.

17. The composition of claim 1, where ingredient (I) is present, and ingredient (I) is selected from the group consisting of tetraethylortho silicate, gamma-aminopropyltriethoxysilane, methacryloxypropyl trimethoxysilane, (ethylenediaminepropyl)trimethoxysilane, and (gamma-isocyanopropyl)triethoxysilane, and a combination thereof.

18. The composition of claim 1, where ingredient (J) is present, and ingredient (J) is a non-polar hydrocarbon.

19. The composition of claim 1, where ingredient (K) is present, and ingredient (K) is selected from the group consisting of an antioxidant, a UV absorber, a UV stabilizer, a heat stabilizer, and a combination thereof.

20. The composition of claim 1, where ingredient (L) is present, and ingredient (L) is selected from the group consisting of aliphatic hydrocarbon resin, a hydrogenated terpene resin, a rosin esters, a hydrogenated rosin glycerol ester, and a combination thereof.

21. A method comprising:
I) adding (D) 5 to 30 weight % a water release agent that releases water over an application temperature range to a composition comprising:
  (A) 10 to 65 weight % of a moisture-curable, silane-functional, elastomeric, organic polymer;
  (B) 0.1 to 3 weight % of a condensation catalyst;
  (C) 15 to 25 weight % of a physical drying agent;

(E) 0 to 30 weight % of a filler;
(F) 0 to 30 weight % of a non-reactive, elastomeric, organic polymer;
(G) 0 to 5 weight % of a crosslinker;
(H) 0 to 5 weight % of a chemical drying agent other than ingredient (G);
(I) 0 to 5 weight % of an adhesion promoter other than ingredients (G) and (H);
(J) 0 to 20 weight % of a microcrystalline wax, which is a solid at 25° C.;
(K) 0 to 3 weight % of an anti-aging additive; and
(L) 0 to 20 weight % of a tackifying agent; and
II) causing the water to be released from the hydrated water release agent, thereby curing the product of step 1).

22. The method of claim 21 comprising mixing the ingredients under shear.

23. The method of claim 22, where the ingredients are mixed under vacuum or a dry inert gas, or both.

24. The method of claim 21, where step II) is performed by heating the composition at a temperature ranging from 80° C. to 120° C. during applying the composition to a substrate, after applying the composition to a substrate, or a combination thereof.

25. The method of claim 21, where step II) is performed by heating the composition at a temperature ranging from 80° C. to 110° C. after the composition is interposed between two substrates.

26. An insulating glass unit 201 comprising:
a first glass pane 101;
a second glass pane 102 spaced a distance from the first glass pane 101; and
a cured product 103 of a composition interposed between the first and second glass panes, where the cured product 103 forms a spacer, seal, moisture barrier, gas barrier, and desiccant matrix between the first and second glass panes; where the composition comprises:
(A) 10 to 65 weight % of a moisture-curable, silane-functional, elastomeric, organic polymer;
(B) 0.1 to 3 weight % of a condensation catalyst;
(C) 15 to 25 weight % of a physical drying agent;
(D) 5 to 30 weight % a water release agent that releases water over an application temperature range;
(E) 0 to 30 weight % of a filler;
(F) 0 to 30 weight % of a non-reactive, elastomeric, organic polymer;
(G) 0 to 5 weight % of a crosslinker;
(H) 0 to 5 weight % of a chemical drying agent other than ingredient (G);
(I) 0 to 5 weight % of an adhesion promoter other than ingredients (G) and (H);
(J) 0 to 20 weight % of a microcrystalline wax, which is a solid at 25° C.;
(K) 0 to 3 weight % of an anti-aging additive; and
(L) 0 to 20 weight % of a tackifying agent.

27. A process for manufacturing the insulating glass unit of claim 26 comprising:
i) bringing the first glass pane and the second glass pane into a parallel position spaced apart by an interpane space,
ii) applying the composition into the interpane space along the perimeter of the first glass pane and the second glass pane, and
iii) curing the composition.

28. A process for manufacturing the insulating glass unit of claim 26 comprising:
i) applying the composition as a filament seal around the perimeter of the first glass pane,
ii) moving the second glass pane into a parallel position to the first glass pane such that the first glass pane and the second glass pane are spaced apart by an interpane space, optionally
iii) filling the interpane space with a gas,
iv) pressing the second glass pane against the filament seal formed on the first glass pane, and
v) curing the composition.

29. A process for manufacturing the insulating glass unit of claim 26 comprising:
i) applying the composition as a filament seal onto a support to which the composition adheres less well than to glass,
ii) transferring the filament seal from the support onto the first glass pane,
iii) pressing the first glass pane and the second glass pane together in a parallel position, and
iv) curing the composition.

* * * * *